US012097593B2

(12) United States Patent
Morris et al.

(10) Patent No.: US 12,097,593 B2
(45) Date of Patent: Sep. 24, 2024

(54) MULTIFACETED VISE-JAW COVER

(71) Applicant: New Revo Brand Group, LLC, Plymouth, MN (US)

(72) Inventors: Matthew C. Morris, Minneapolis, MN (US); Ryan Chernik, New Brighton, MN (US); Ryan Jacobson, Minneapolis, MN (US); Mike Feesl, Inver Grove Heights, MN (US)

(73) Assignee: NEW REVO BRAND GROUP, LLC, Plymouth, MN (US)

( * ) Notice: Subject to any disclaimer, the term of this patent is extended or adjusted under 35 U.S.C. 154(b) by 330 days.

(21) Appl. No.: 17/455,034

(22) Filed: Nov. 16, 2021

(65) Prior Publication Data

US 2022/0072684 A1 Mar. 10, 2022

Related U.S. Application Data

(63) Continuation-in-part of application No. 16/989,878, filed on Aug. 10, 2020, now Pat. No. 11,493,299,
(Continued)

(51) Int. Cl.
*B25B 5/16* (2006.01)
*B25B 1/20* (2006.01)
(Continued)

(52) U.S. Cl.
CPC .............. *B25B 1/2405* (2013.01); *B25B 1/20* (2013.01); *B25B 5/068* (2013.01); *B25B 5/102* (2013.01); *B25B 5/163* (2013.01)

(58) Field of Classification Search
CPC ....... B25B 5/163; B25B 1/2405; B25B 1/103; B25B 1/2452; B25B 1/2484; B25B 5/006;
(Continued)

(56) References Cited

U.S. PATENT DOCUMENTS 1,071,289 A * 8/1913 Bader .................... B25B 1/2405 269/95
1,205,149 A * 11/1916 Bovee .................... B25G 1/063 81/177.9

(Continued)

FOREIGN PATENT DOCUMENTS

CN 103056790 A 4/2013
CN 203956763 U 11/2014

(Continued)

OTHER PUBLICATIONS

Master Gun Vise™ Gun-Fit™ (from Real Avid) Retrieved from: https://www.youtube.com/watch?v=Azx8037Vja8 (Year: 2022).*

(Continued)

*Primary Examiner* — Mahdi H Nejad
(74) *Attorney, Agent, or Firm* — GRUMBLES LAW PLLC; Brittany Haanan

(57) ABSTRACT

A firearm maintenance aid can include a firearm vise and a firearm support device. Firearm vise can include vise jaws, a threaded rod connecting vise jaws together, and jaw pin holes in each jaw, the holes extending from an outer surface of a jaw through to an inner surface of each jaw, wherein the holes in the first jaw align with the holes in the second jaw. Firearm support device can include a clamping portion and a supporting portion. The clamping portion can be clamped between the jaws of the firearm vise, can include two parallel clamping faces, and can define vise pin holes that align with the jaw pin holes. The supporting portion can be located opposite the clamping portion and can include a cylindrical shaft. Vise pins can be received by the jaw pin holes and vise pin holes to fixedly connect the support device to the vise.

20 Claims, 12 Drawing Sheets

Related U.S. Application Data which is a continuation-in-part of application No. 16/545,779, filed on Aug. 20, 2019, now Pat. No. 10,739,101.

(60) Provisional application No. 62/724,279, filed on Aug. 29, 2018.

(51) Int. Cl.
*B25B 1/24* (2006.01)
*B25B 5/06* (2006.01)
*B25B 5/10* (2006.01)

(58) Field of Classification Search
CPC ......... B25B 5/102; B25B 5/068; B25B 1/241; B25B 1/2457; F41A 23/01
USPC .......................................................... 269/271
See application file for complete search history.

(56) References Cited

U.S. PATENT DOCUMENTS 2,907,238 A 10/1959 White
2,948,172 A 8/1960 Gustav et al.
3,322,423 A 5/1967 Anatoliy et al.
3,463,479 A 8/1969 Hennessey
3,718,327 A 2/1973 Nunez
3,783,548 A 1/1974 Fisher
4,184,667 A 1/1980 Alessio
4,252,305 A 2/1981 Pasch
4,437,654 A 3/1984 Chiappetti
4,569,530 A * 2/1986 Cross .................... B23B 31/102 279/123
4,807,861 A 2/1989 Kimball
4,854,568 A * 8/1989 Baeza .................... B23Q 3/104 269/902
4,861,010 A 8/1989 Neil
4,971,301 A 11/1990 Yang
5,092,572 A 3/1992 Litwak
5,224,692 A 7/1993 Anderson et al.
5,236,183 A 8/1993 Curtis
5,243,883 A 9/1993 Savage
5,419,540 A 5/1995 Teafatiller
5,690,416 A 11/1997 Gennep
5,921,536 A 7/1999 Bernstein
6,098,498 A * 8/2000 Ming ...................... B25C 3/008 81/421
6,105,948 A 8/2000 Young
6,170,813 B1 1/2001 Bowers
6,293,041 B2 9/2001 Weaver
6,347,791 B1 * 2/2002 Chervenak .............. B25B 5/068 269/166
6,640,666 B2 11/2003 Pliley
6,672,578 B1 1/2004 Martens
6,685,176 B2 * 2/2004 Wirth, Jr. ................ B25B 5/102 269/283
6,971,643 B1 12/2005 Garrison
7,017,898 B2 3/2006 Varzino et al.
7,055,813 B2 6/2006 Hexamer, Jr.
7,111,836 B1 9/2006 West
7,201,541 B2 4/2007 Barmann
7,290,760 B1 11/2007 Lindsay
7,356,960 B1 4/2008 Knitt
7,537,218 B2 * 5/2009 Wachtler ............. B23B 31/1602 279/123
7,584,690 B2 9/2009 Cauley
7,690,606 B1 4/2010 Batdorf
7,886,474 B2 2/2011 Werner
7,946,071 B2 5/2011 Cauley
7,980,017 B2 7/2011 Harman, III
7,984,895 B2 * 7/2011 Strauss ................... B25B 5/163 269/45
8,167,292 B1 5/2012 Mucciacciaro et al.
8,296,988 B2 10/2012 Yale et al.
8,297,605 B2 10/2012 Lee et al.
8,308,392 B2 11/2012 Yu et al.
8,316,571 B1 11/2012 Holland
8,322,068 B2 12/2012 Wilson
8,322,699 B2 12/2012 Prell et al.
8,342,495 B2 1/2013 Weissenborn
8,382,048 B2 2/2013 Nesper et al.
8,578,645 B2 11/2013 Cauley
8,707,609 B2 4/2014 Fisher
8,931,193 B1 * 1/2015 Bogart .................... F41A 23/16 42/1.06
8,931,201 B2 1/2015 Gianladis et al.
9,121,423 B2 9/2015 Sharpe et al.
9,302,374 B1 * 4/2016 Cusenza ................. B25B 13/58
9,372,041 B1 6/2016 Geissele
9,421,672 B2 8/2016 Rowlay et al.
D768,254 S 10/2016 Geissele
9,506,711 B2 11/2016 Gomez
9,583,083 B1 2/2017 Berlinger
9,616,552 B1 4/2017 McClain
9,733,036 B2 8/2017 Tucker et al.
9,737,064 B2 8/2017 Durrant
9,816,546 B2 11/2017 Gomez
9,823,035 B2 11/2017 Geissele et al.
9,933,226 B2 4/2018 Tucker et al.
9,976,693 B1 5/2018 Delikat et al.
10,024,621 B2 7/2018 Hutson
10,040,172 B2 8/2018 Weissenborn
10,178,209 B1 1/2019 Hesse
D844,093 S 3/2019 Shelton et al.
10,384,331 B2 8/2019 Maggert
D870,840 S 12/2019 Cheng et al.
11,472,005 B2 * 10/2022 Wang ...................... B25B 5/163
11,493,299 B2 * 11/2022 Jacobson ................ F41A 11/00
2002/0171191 A1 11/2002 Hudson
2003/0160373 A1 * 8/2003 Yang ..................... B25B 1/2452 269/282
2004/0195479 A1 10/2004 Gulley
2005/0188578 A1 9/2005 Engel
2008/0018062 A1 * 1/2008 Wachtler ............. B23B 31/1602 279/123
2009/0229160 A1 9/2009 Elliott et al.
2009/0273132 A1 11/2009 Parks et al.
2009/0278296 A1 11/2009 Fulcher et al.
2012/0227305 A1 9/2012 Fontenot et al.
2012/0255212 A1 10/2012 Werner
2014/0075817 A1 3/2014 Gomez
2014/0246824 A1 * 9/2014 Fiegener ............... B25B 1/2457 269/265
2015/0014911 A1 1/2015 Melanson
2015/0115114 A1 4/2015 White
2016/0202008 A1 7/2016 Geissele
2016/0339562 A1 11/2016 Myers
2017/0018303 A1 1/2017 Yang et al.
2017/0108303 A1 4/2017 Gomez
2017/0216997 A1 * 8/2017 Smith ....................... B25B 5/16
2018/0117738 A1 5/2018 Klumper
2019/0162499 A1 * 5/2019 Jacobson ................ F41A 23/18
2020/0180115 A1 6/2020 Yang
2021/0170549 A1 * 6/2021 Wang ...................... B25B 5/068
2022/0281076 A1 * 9/2022 Morris ...................... B25B 1/10
2024/0044602 A1 * 2/2024 Morris .................... B25B 1/103

FOREIGN PATENT DOCUMENTS

CN 206316953 U 7/2017
DE 2131378 A1 12/1972
DE 8612639 U1 6/1987
DE 102013004952 A1 3/2014
DE 202014006697 U1 10/2014
EA 027332 B1 7/2017
EP 0201817 A3 7/1988
GB 415518 A 8/1934
GB 662672 A 12/1951
GB 707546 A 4/1954
GB 2345656 A 7/2000

(56) References Cited

FOREIGN PATENT DOCUMENTS

| | | |
|---|---|---|
| GB | 2426948 B | 5/2007 |
| WO | 8601267 A1 | 2/1986 |

OTHER PUBLICATIONS

Gun Fit Jaws (Amazon) Retrieved from: https://www.amazon.com/s?k=gun+fit+jaws&hvadid=634501801402&hvdev=c&hvlocphy=1018671&hv netw=g&hvqmt=e&hvrand=13330848230366123960&hvtargid=kwd- (Year: 2023).*
A New Multifunctional Universal Table Vice; Document ID: CN 206316953 U; Date Published: Jul. 11, 2017; Inventor Name: Chen, Zhi-Qiang; Date Filed: Nov. 2, 2016 (Year: 2017).*
Clamping Assembly; Patent No. 2017088030; Document ID: WO 2017088030 A1; Date Published: Jun. 1, 2017; Inventor Name: Saxony Mark; Date Filed: Nov. 25, 2016 (Year: 2017).*
Panavise Deluxe Jaw Pads; Found at: https://web.archive.org/web/20100322210148/https://www.panavise.com/index.html?pageID=1&id1=1&startat=1&--woSECTIONSdatarq=1&--SECTIONSword=ww (Year: 2010).*
PanaVise-346-datasheet Catalogue (Year: 2023).*
New Type Table Vice Jaw; Document ID: CN 104117938 A; Date Published: Oct. 29, 2014; Inventor Name: Dong, Yang-de; Zhu, Yun-hui; Date Filed: Apr. 28, 2013 (Year: 2014).*
New Type Table Vice Jaw; Patent No. 104117938; Document ID: CN 104117938 A; Date Published: Oct. 29, 2014; Inventor: Dong Yang-de, Zhu Yun-hui; Date Filed: Apr. 28, 2013 (Year: 2014).*
Clamping Assembly; Document ID: WO 2017088030 A1; Date Published: Jun. 1, 2017; Inventor: Saxony Mark; Date Filed: Nov. 25, 2016 (Year: 2017).*
Notice of Allowance pertaining to corresponding U.S. Appl. No. 16/989,878, mailed Aug. 2, 2022.
Howard's Total Vise, The Crossover Vise System, https://www.totalvise.com/?gclid=CjwKCAjw682TBhATEiwA9crl34dV7...8v9kBGWe6A1fjeVrnWaz7gn6LZB7uijtehys6HdN8hqRnNdxoCEw4QAvD_BwE, accessed May 5, 2022.
Berry's Bullets, VersaCradle Machine Vise System, https://www.berrysmfg.com/product/vc-vise, accessed May 5, 2022.
2pcs Vise Jaws, 5.5' Multi-Groove Magnetic Soft Bench Vise Vice Jaw Pad Accessories. Retrieved Jul. 2020. https://www.amazon.com/2pcs-Multi-Groove-Magnetic-Bench-Accessories.
3-Axis Precision Tilting Vise 3"Jaw Width. Retrieved Jul. 2020. https://www.wiltontools.com/US/en.
CB01 C-Clamp + High Weight Load Inner Ball Magic Grip. Retrieved Jul. 2020. https://www.digitalfoto.cn/cb01-c-clamp-high-weight-load-inner-ball-magic-grip.
U.S. Appl. No. 13/562,651.
Hyskore Cleaning & Sighting Vise. Retrieved Jan. 2020. https://www.amazon.com/HYSKORE-1003627-Hyskore-Cleaning-Sighting.
Kurt Workholding. Retrieved Jul. 2020. https://www.kurtworkholding.com/product/kurt-3-in-one-system-jaw-plates/.
Lyman Revolution Gun Vise. Retrieved Jan. 2020. https://www.midwayusa.com/product.
Mission Automotive Store, Vise Soft Jaws / Vice Jaw Pads—Magnetic—4.5 Inch Length, Multi-Groove Design, Durable TPU Rubber Covers—Fit Wide Array of Vises / Vices and Blocks (4 5 6 In)—By Mission Automotive, https://www.amazon.com/Vise-Soft-Jaws-Vice-Pads/dp/B01FT2QTDA, accessed Feb. 10, 2022.
Model:346NM Deluxe Non-Marking Neoprene Jaw Pads. Retrieved Jul. 2020. https://www.panavise.com/index.html.
Monsterballvise. Retrieved Jan. 2020. https://www.monsterballvise.com/index.htm.
Multi-Angle Base Vise. Website. Retrieved Jan. 2020. https://www.stanleytools.com/products/hand-tools/manual-fastener-tools/spring-metal-angle/multiangle-base-vise/83-069m.
NPL: https://gunmagwarehouse.com/blog/real-avid-new-ar-building-tools-shot-show-2018/ Jan. 29, 2018, pp. 9-12.
Office Action pertaining to U.S. Appl. No. 16/989,878, mailed Feb. 2, 2022.
OTIS Technology, Soft Vise Jaws, https://otistec.com/otis-soft-vise-jaws/, accessed Feb. 10, 2022.
Stanley Maxsteel Multi Angle Vice. Website. Retrieved Jan. 2020. https://www.youtube.com/watch?v=jSE2gOqQIvE.
Tipton Gun Vise. Retrieved Jul. 2020. https://www.midwayusa.com/product/101491760.
Ultimate Versatile Vise. Retrieved Jul. 2020. https://www.garrettwade.com/ultimate-versatile-vise.html.
VJ-6A060201MR-MACHINE Reversible Aluminium Vise Soft Jaws for a 6' VISE . . . Retrieved Jul. 2020. https://www.amazon.com/VJ-6A060201MR-MACHINE-REVERSIBLE-ALUMINIUM-VISE.
Wilton Junior 343 Pow-R-Arm. Retrieved Jan. 2020. https://www.northerntool.com/shop/tools/product_200711704_2007.

* cited by examiner

FIG. 8
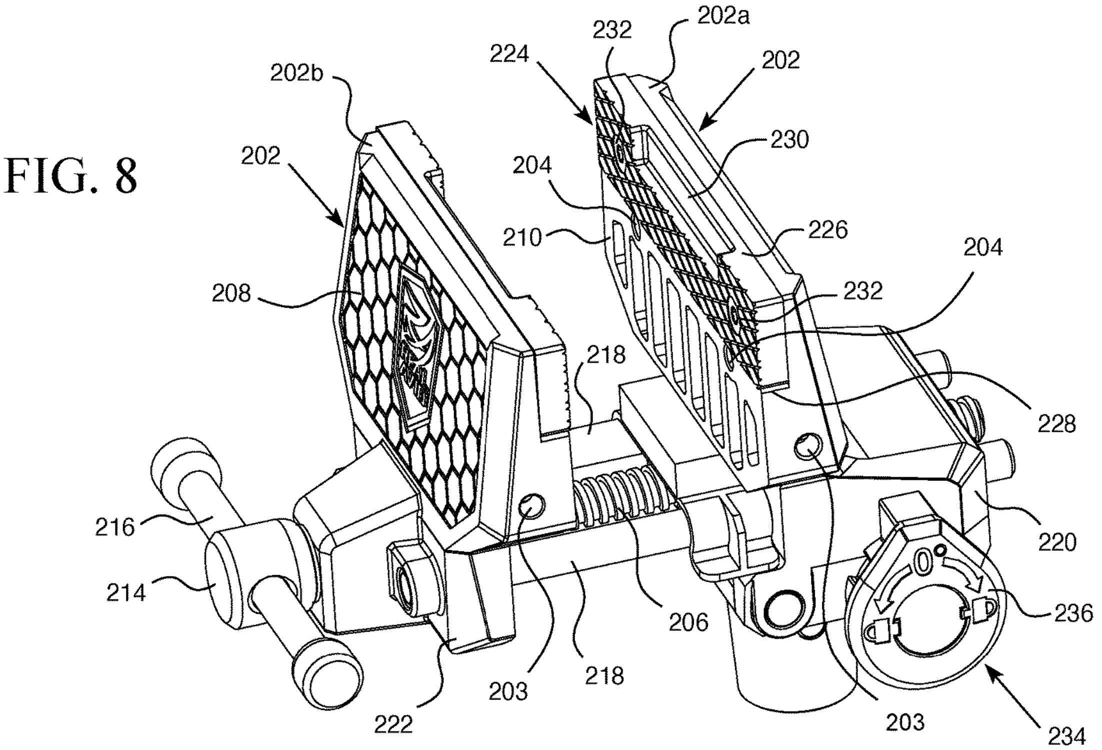
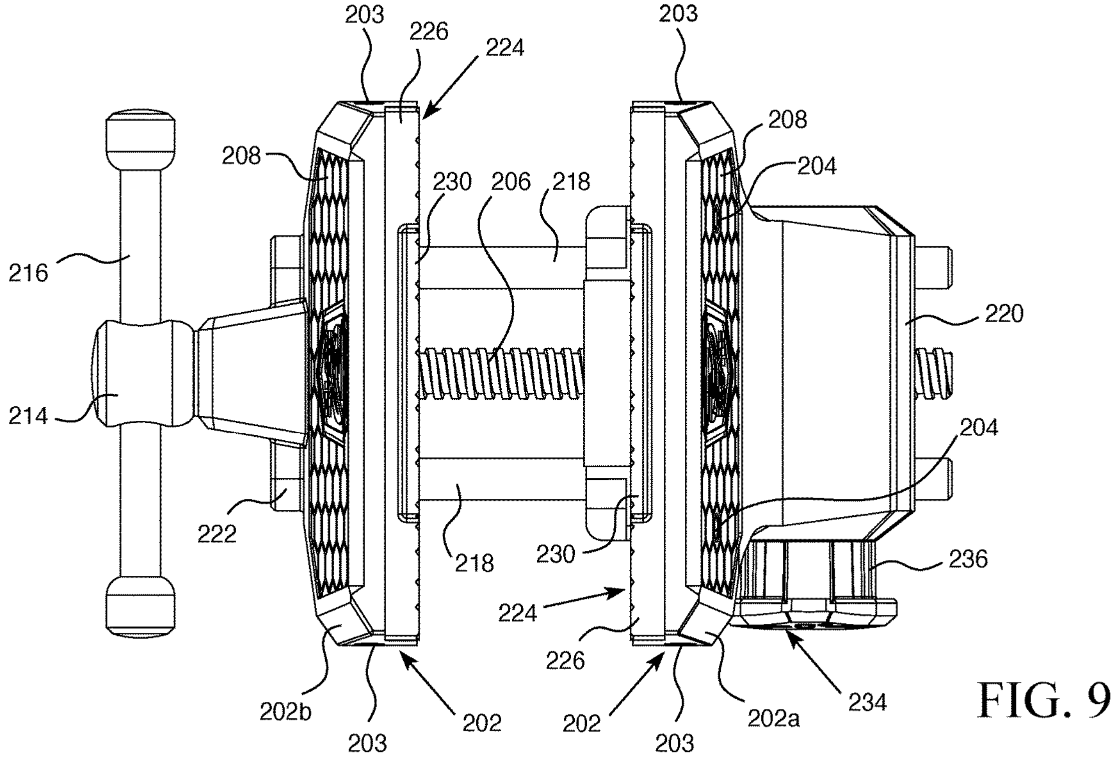
FIG. 9

MULTIFACETED VISE-JAW COVER

CROSS-REFERENCE TO RELATED APPLICATION

This application is a continuation-in-part of U.S. Non-Provisional application Ser. No. 16/989,878, which is a continuation-in-part of U.S. Non-Provisional application Ser. No. 16/545,779, filed Aug. 20, 2019, and titled FIREARM SUPPORT DEVICE, now U.S. Pat. No. 10,739,101, which claims the benefit of U.S. Provisional Patent Application Ser. No. 62/724,279, filed Aug. 29, 2018, and titled FIREARM SUPPORT DEVICE, which is herein incorporated by reference in its entirety.

FIELD OF THE INVENTION

This disclosure relates to vise accessories, and more particularly, to vise-jaw covers and multifaceted vise-jaw covers for assistance in maintenance of a device that may be held in a jaw of a vise.

BACKGROUND

During maintenance activities, there are times when a device may need to be held within the jaws of a vise; during such maintenance activities, devices held within a vise's jaw are easily marred or damaged due to the nature of the devices construction and the amount of force applied to the device via an engaging face of the vise jaw. Armorers that work on devices such as firearms, including rifles (or subcomponents thereof) are often held or otherwise supported within the jaws of a vise. This can free up an armorer's hands for performing maintenance tasks and can enable greater application of torque to the firearm and components therein. In some cases, an armorer can clamp a firearm component into a vise in such a way that the component may be damaged when the armorer applies force to the component during a maintenance procedure; for example, when an armorer applies a large amount of torque with a wrench to the component causing the component to be scratched by the engaging face of the vise jaw. It may be desirable to provide vise support mechanisms that can provide secure support for a firearm component while delivering minimal or no risk of damage to said components as a result of clamping within the vise jaws. It is further desirable to provide a vise designed to work in coordination with other firearm maintenance accessories.

Various known vise-jaw covers demonstrate shortcomings that limit their usefulness; particularly when their use involves the maintenance of firearms. Some known vise-jaw covers may include grooves within their faces or consist of faces with deformable materials; however, they do not provide efficient usability and can cause increased storage demands due to their single-sided nature. The present disclosure seeks to solve at least that problem with its double-face nature.

SUMMARY

This disclosure relates to firearm maintenance aids, and more particularly, relates to vises jaw covers and multi-faceted vise-jaw covers for firearm maintenance. The multi-faceted vise-jaw covers may work in combination with another multi-faceted vise-jaw cover on a single vise where the vise has two opposing jaws.

In an illustrative but non-limiting example, this disclosure provides a multi-faceted vise-jaw cover for a vise having a core made of a first material, the core including an opening at its base to allow the jaw cover to envelope a vise jaw. One face of the core can include a plurality of grooves, and attached to the second, relatively flat, face may be an overlay comprising a second material that is deformable. The vise-jaw cover may have two orientations depending on a user's needs; one orientation allows the face with the plurality of grooves to engage another vise jaw, and a second orientation that allows the second face with its deformable material to engage another vise jaw. In some cases, the right side or the left side of the core can include at least one bolt-hole.

In further examples, the opening of the vise-jaw cover can have its length, width, and height defined by the vise jaw that the cover is intended to be placed upon; allowing for a secure attachment without the need for another physical connection.

In some examples, the vise to be covered with a jaw cover can have a vise jaw with a work-engaging face that is disposed behind the work-engaging face of the jaw cover. The face of an opposing vise jaw may or may not be covered with a jaw cover. Such a configuration may allow a vise-jaw cover that may be reversed in orientation. In some embodiments, a work-engaging face of the vise jaw can be disposed behind either the first face or the second face of the vise jaw cover. Further, the vise jaw cover may further include a vise with a ball joint, wherein the ball joint connects to the vise jaw.

In a further example, the vise jaw may include a bolt-receiving feature disposed between, the engaging and non-engaging faces. Additionally, a vise-jaw cover may include at least one bolt-hole disposed through at least one side between its engaging and non-engaging faces that can align with the bolt-receiving feature of a vise jaw. Further examples may include at least one bolt that passes through the bolt-hole disposed through at least one side of a vise-jaw cover and into a bolt-receiving feature of a vise jaw.

Other examples may include a vise-jaw cover that include two bolt-holes, one bolt-hole on either side of the vise-jaw cover, between the engaging and non-engaging faces. The two bolt-holes may align with two bolt-receiving features disposed on opposite sides of a vise jaw between its engaging and non-engaging faces. A first bolt can be disposed within both the right side bolt-hole and the bolt-receiver, and a second bolt can be disposed within both the left side bolt-hole and the bolt-receiver.

In some examples, the plurality of grooves in the vise jaw cover can include at least two parallel V-shaped grooves that run the length of the first face (for example, from the right side to the left side). Further, at least one of the parallel V-shaped grooves can be defined to hold a firearm Picatinny rail or a firearm barrel. Further examples may include at least two vertical grooves that are perpendicular to the at least two parallel V-shaped grooves. In some examples, the plurality of grooves may consist of shapes that are rhombic, square, circle, and combinations thereof.

In some examples, the first material may be nylon. In some cases, the deformable material may consist of M. foam, #13 foam, #7 foam, and combinations thereof. In some examples, the overlay may be prism shaped and it may be permanently attached to the second face with an adhesive. The overlay can have a length and width substantially equal to the length and width of the second face of the vise-jaw cover.

In another illustrative but non-limiting example, a vise-jaw cover may have a nylon core, a bolt, and an overlay. The nylon core may have a lower side with an opening defined by a vise jaw's length, width, and height. The core may also have a right and left side that each contain a bolt hole that aligns with a bolt-receiving feature on a vise jaw. The nylon core can have a first face with a plurality of grooves and a second face that is relatively flat. The plurality of grooves may include at least two parallel V-shaped grooves that run the length of the first face from the right side to the left side, wherein one of the parallel V-shaped grooves is defined by to hold a firearm picatinny rail and one of the parallel V-shaped grooves is defined to hold a firearm barrel. The plurality of grooves may further include at least two vertical grooves perpendicular to the parallel grooves. The bolt-hole and the bolt receiver may also contain a bolt to secure the vise-jaw cover to a vise jaw. The bolt may be removable. The overlay can include a deformable material and can attach to the second face of the nylon core.

The above summary is not intended to describe each and every example or every implementation of the disclosure. The Description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which:

FIG. 8 is a schematic perspective view of an illustrative example of a portion of a firearm vise;

FIG. 9 is a schematic plan view of the firearm vise of FIG. 8;

DETAILED DESCRIPTION

Figure 1B:
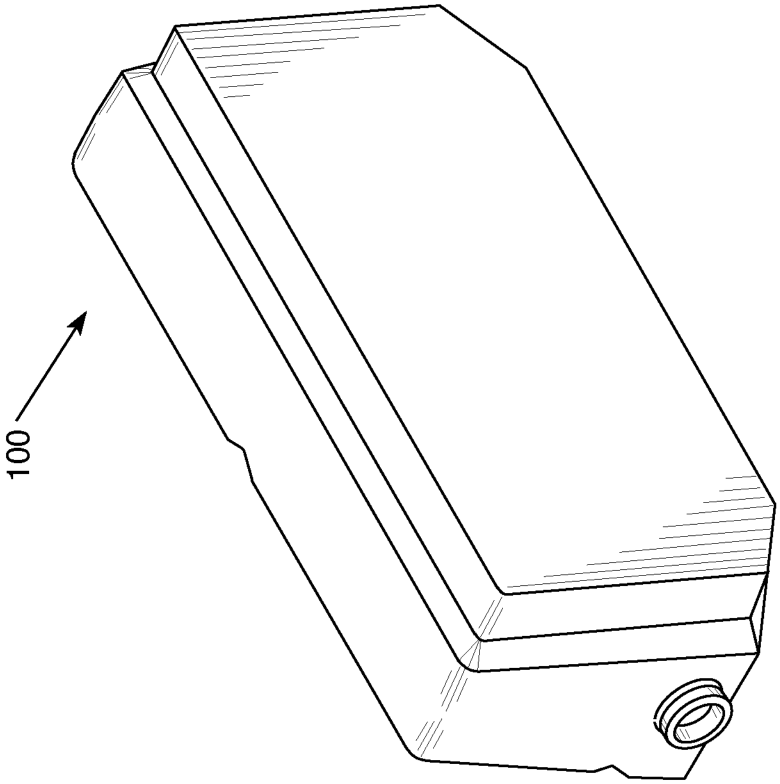
FIG. 1B is a back perspective view of an illustrative example of an embodiment of multi-faceted vise-jaw covers.

The present disclosure relates to an accessory for a vise and, more particularly, relates to a multi-faceted vise-jaw cover with two opposing faces that have varying working surfaces. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

The present disclosure provides a vise-jaw cover that can be interchanged in a quick fashion to support a multitude of devices upon its working surfaces to afford a user flexibility in their maintenance procedures. When used as a pair, a set of multi-faceted vise-jaw covers may be arranged to hold specific structures such as, but not limited to, a firearm within the working surface of either of the cover's faces. The specific structures may be held within predefined grooves of the covers' faces, or they may be held with friction from the covers' faces, which can be comprised of deformable materials. Additionally, the working faces may supply enough holding force to prevent the item that is being maintained from moving while also avoiding any damage or harm to that item's surface. Furthermore, the multi-faceted vise-jaw covers may aid a user to securely and efficiently clean, maintain, assemble, and disassemble a firearm or other non-firearm implement. The vise-jaw covers may undoubtedly work with other non-firearm implements that may fit within the defined grooves of the vise-jaw cover's working surface or may be held within the vise-jaw cover's deformable surface. The vise-jaw covers, when paired, may in some embodiments have faces comprised of symmetrical working surfaces. Moreover, a vise-jaw cover may work in combination with either of another vise-jaw cover's working surfaces. For example, a vise-jaw cover with predefined grooves may work in combination with a vise-jaw cover with a deformable surface in a non-symmetric configuration.

Figure 1A:
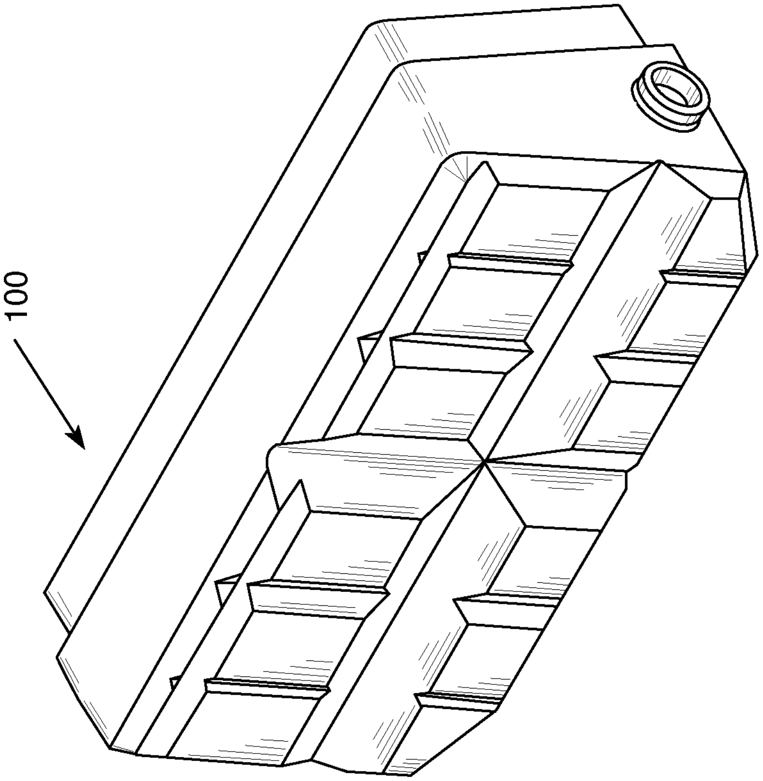
FIG. 1A is a front perspective view of an illustrative example of an embodiment of multi-faceted vise-jaw covers.

FIGS. 1A and 1B are schematic perspective views of an illustrative example of a multi-faceted vise-jaw cover 100.

In this particular embodiment, one working surface can be made from a deformable material that is adhered to a core, and the other working surface can be integral to the core of the view-jaw cover 100 such that it is comprised of the same material as the core.

Figure 2:
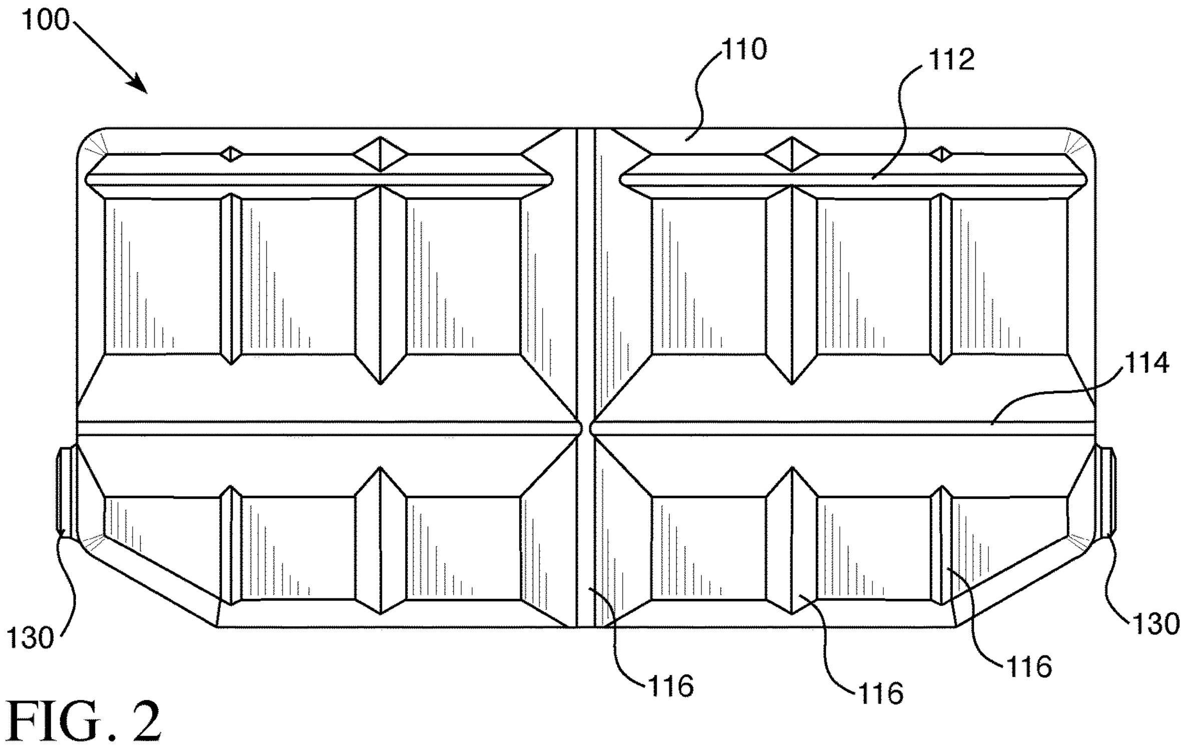
FIG. 2 is a front view of a first face of an embodiment of a multi-faceted vise-jaw cover.

FIG. 2 is a front view of a multi-faceted vise-jaw cover 100. A first face 110, in this embodiment, can be integral to the core of the vise-jaw cover 100 such that the core and the first face 110 are comprised of the same material. In some embodiments, the core and the first face 110 are manufactured and configured such that they are one, molded piece that cannot be separated or two molded pieces that cannot be separated non-destructively.

Within the first face 110 may be a first horizontal groove 112, wherein the first horizontal groove 112 can be structured into a V-shape for conformance with the shape of a firearm's Picatinny rail. A second horizontal groove 114 can also be structured into a V-shape. Both the first and second horizontal grooves can be parallel to each other, and both can run the length of the first face 110 from the right to left sides. Other configurations may be implemented in the horizontal grooves to secure other devices, and such configurations may include U-shaped grooves and/or any other geometric shapes which may conform to other firearm and non-firearm elements alike. For example, the horizontal grooves may have a profile such as, but not limited to, rhombic, square, circle, and combinations thereof. In some embodiments, two vise-jaw covers 100 may be used (one over each of the vise jaws of a vise) and the horizontal grooves on a first of the two vise-jaw covers 100 may mirror the horizontal grooves on a second of the two vise-jaw covers 100.

In some embodiments, the first and second horizontal grooves 112, 114 are the same width and depth. In other embodiments, the grooves 112, 114 are different widths and/or depths. For example, as illustrated in FIGS. 1-4, the first horizontal groove 112 is both narrower and shallower than the second horizontal groove 114. However, this is not necessary and, in some cases, the first horizontal groove 112 may be only narrower or shallower than the second horizontal groove 114 and in other cases the first horizontal groove 112 may be wider and/or deeper than the second horizontal groove 114.

Figure 3:
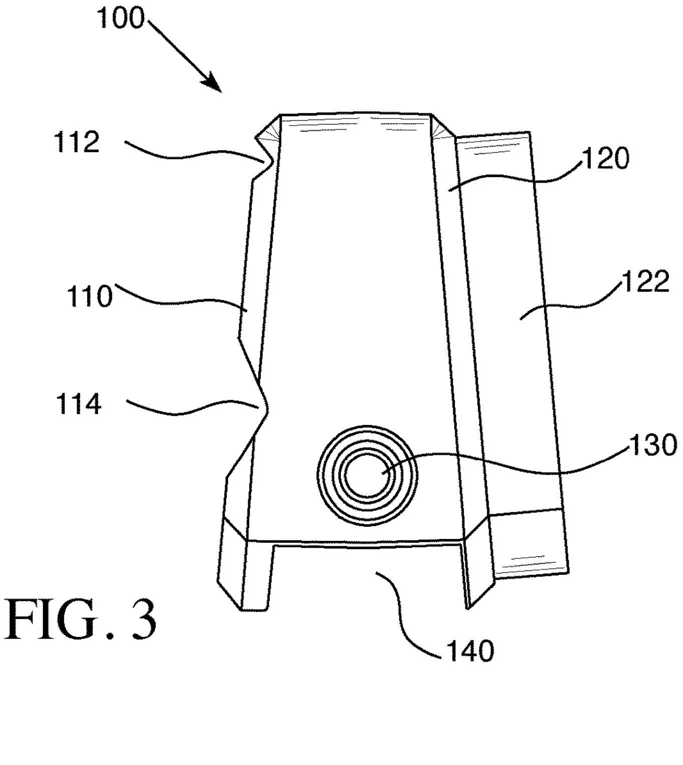
FIG. 3 is a right side view of an embodiment of a multi-faceted vise-jaw cover.
Figure 4:
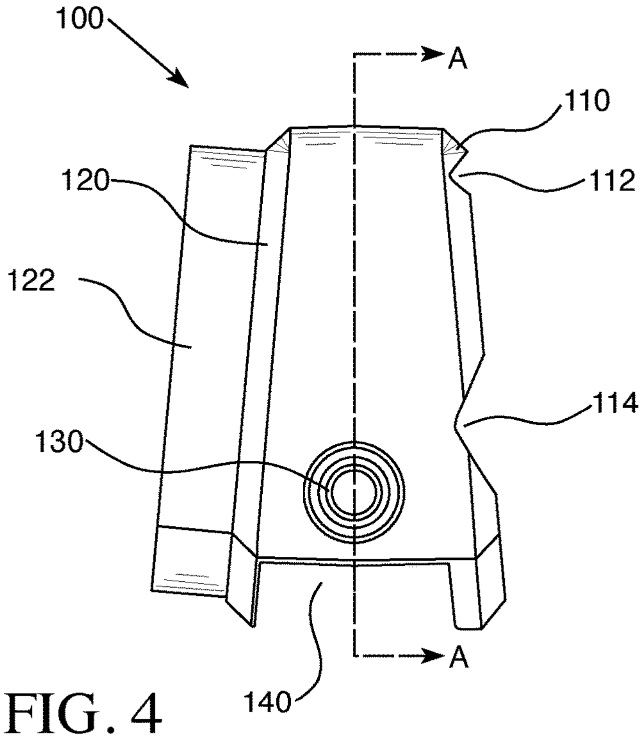
FIG. 4 is a left side view of the embodiment of a multi-faceted vise-jaw cover marked with cross-section A-A.

Additionally, the first horizontal groove 112 may be positioned nearer to the top of the vise-jaw cover 100 than the second horizontal groove 114. For example, as illustrated in FIGS. 3-4, the first horizontal groove 112 may be positioned near the top of the front face 110. Similarly, the second horizontal groove 114 may be positioned near the bottom of the front face 110. In some cases, the two grooves 112, 114 may be closer together such that one or both are not near the perimeter of the vise-jaw cover 100 (for example, the top or bottom) but are closer to the middle. For example, as illustrated in FIGS. 3-4, the second horizontal groove 114 may be positioned ⅓ to ½ of the way up from the bottom of the front face 110.

In addition to horizontal grooves, as illustrated in FIG. 2, the vise-jaw cover 100 may include a plurality of vertical grooves 116. These grooves can be perpendicular, in this embodiment of vise-jaw cover 100, to the first and second horizontal grooves 112 and 114, and the vertical grooves 116 can span the height of the first face 110. Also similar to the horizontal grooves, the vertical grooves may be V-shaped or they may be have a profile such as, but not limited to, rhombic, square, circle, and combinations thereof. In other embodiments, the vertical grooves may crisscross each other to allow the vise jaws the ability, when enveloped by the vise-jaw covers, to hold items at predefined and user desirous angles. In some cases, there are five vertical grooves, as illustrated in FIGS. 1-2. However, the vise-jaw cover 100 can have fewer or more than five. Just as with the horizontal grooves, the vertical grooves may be configured into other shapes including U-shapes and/or any other geometries. As with the horizontal grooves, in some embodiments, two vise-jaw covers 100 may be used (one over each of the vise jaws of a vise) and the vertical grooves on a first of the two vise-jaw covers 100 may mirror the vertical grooves on a second of the two vise-jaw covers 100.

As with the first and second horizontal grooves 112, 114, the vertical grooves 116 may be the same width and depth or they may be different widths and/or depths. For example, as illustrated in FIGS. 1-2 and 5-6, the middle vertical groove can be both wider and deeper than the other vertical grooves of the vise-jaw cover 100. Further, the two vertical grooves on either side of the middle vertical groove, while narrower and shallower than the middle groove, can be wider and deeper than the two outermost vertical grooves. In this way, the vertical grooves 116 are a mirror reflection of each other when a vertical line is drawn down the center of the vise-jaw cover 100. However, the vertical grooves are not limited to this size configuration, and in some cases, each vertical groove may be of a different width and depth than each other vertical groove. In other cases, the size configuration may not be mirrored. For example, the width and depth of each vertical groove may increase from one side of the vise-jaw cover 100 to the opposite side.

Figure 5:
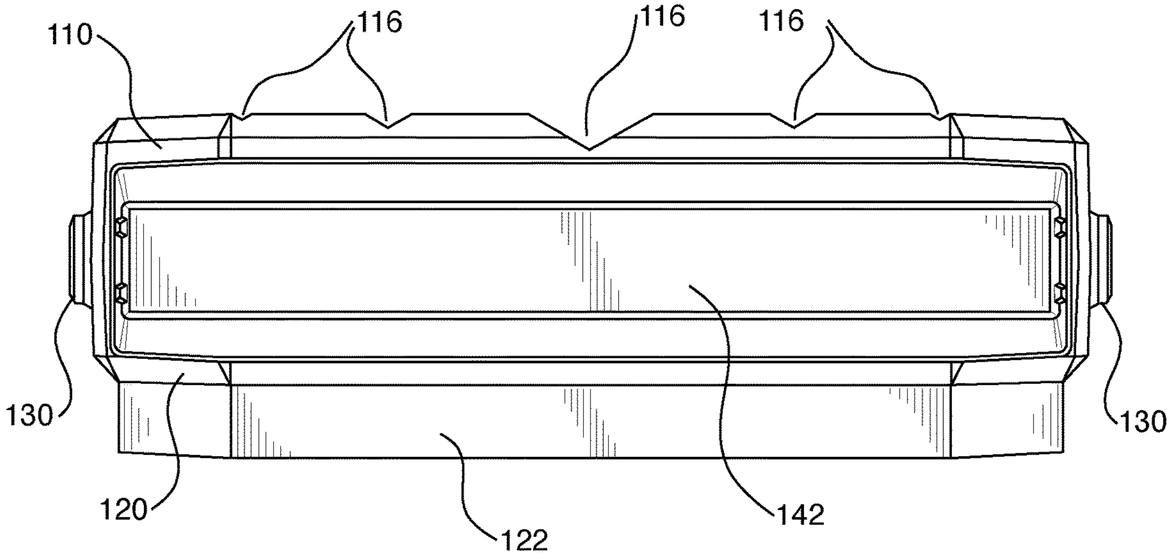
FIG. 5 is a bottom plan view of an embodiment of a multi-faceted vise-jaw cover.
Figure 6:
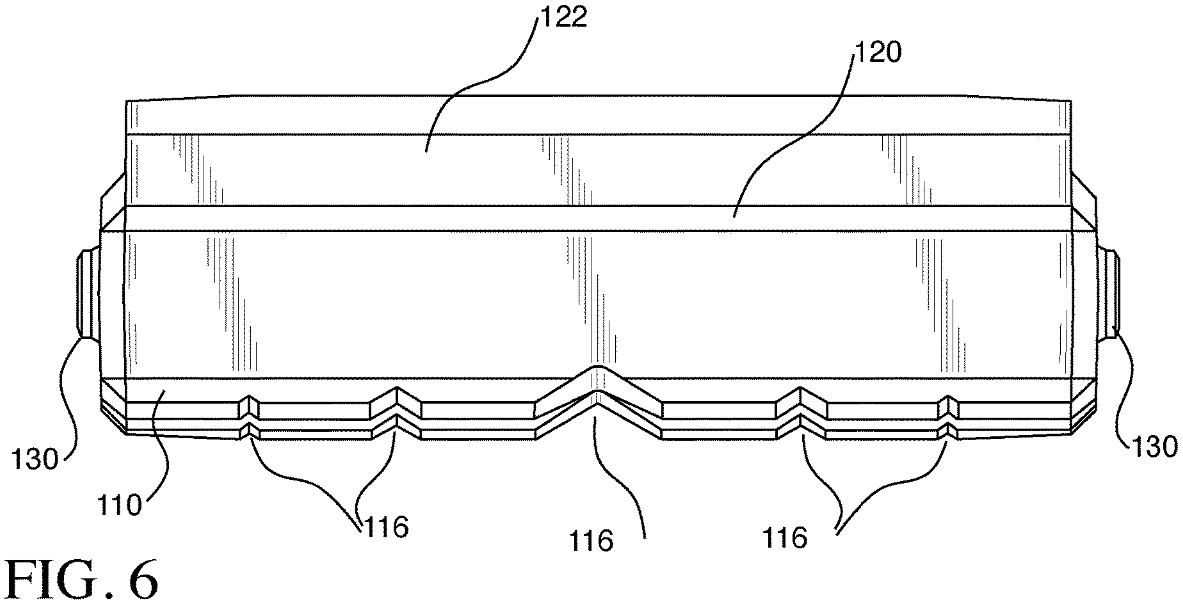
FIG. 6 is a top plan view of the embodiment of a multi-faceted vise-jaw cover.

Regarding positioning, the vertical grooves 116 may be evenly spaced across the face of the vise-jaw cover 100. For example, as illustrated in FIGS. 5-6, the middle vertical groove may be positioned at the central horizontal axis point of the front face 110. From there, two additional vertical grooves may be positioned on either side of the middle vertical groove such that there is equal distance between each of the grooves as well as the outer perimeter of the vise-jaw cover 100. However, in some cases, the vertical grooves 116 may be positioned closer together such that they are, as a group, closer to the middle or to one side of the vise-jaw cover 100. In other embodiments, the vertical grooves 116 may be unevenly spaced across the front face 100 and there may be uneven spacing between all or some of the grooves.

In addition to horizontal and vertical grooves, the vise-jaw cover 100 can include two bolt-holes 130 that can be located on both the right and left sides of the vise-jaw cover 100, as illustrated in FIGS. 2 and 5-7. Other embodiments may only contain one bolt-hole or may contain multiple bolt holes on one or both sides. Each bolt-hole 130 may include a center hole and may allow for the placement of a bolt, which may include a ball-lock, through its center hole and into a bolt-receiver (not shown) that is disposed within a vise jaw that is structured to receive the bolt and, if applicable, the ball-lock of the bolt. In some cases, the bolt-hole 130 may also be threaded. In other cases, the bolt-hole 130 is not threaded. The bolt (not shown) may secure the vise-jaw cover 100 to a vise jaw by being placed through the bolt-hole 130 and into the vise jaw's bolt-receiver 203. Pins 212, illustrated in FIG. 11, may act as a bolt to secure the vise-jaw cover.

In some embodiments, the two bolt-holes 130 can be symmetrical in their placement within each side of the vise-jaw cover 100 such that both bolt-holes 130 are spaced the same distance from the first face 110 as they are from the second face 120 and share a common axis. Additionally, the bolt-holes 130 may be positioned lower on the vise-jaw cover 100 than the second horizontal groove 114, as illustrated in FIG. 2. Other embodiments may include offset configurations for the bolt-holes to accommodate a particular vise jaw shape where the bolt-holes do not share a common axis and are not centered with respect to the first face 110 and the second face 120. For example, a vise may be comprised of a vise jaw that is oblong in relation to its work engaging and non-engaging sides; such a vise jaw would be dissimilar to the vise jaws illustrated in FIGS. 8 to 11 and 15 to 16, where the jaws 202 have roughly the same distance from the bolt-receiver to the work-engaging inner face 210 and the bolt-receiver to the nonwork-engaging outer face 208. Therefore, a vise-jaw cover 100 may have a first bolt-hole 130 that is a first distance from the first face 110, wherein that first distance is a different distance than a second distance between the first bolt-hole 130 and a second face 120. The vise-jaw cover 100 may then have a second bolt-hole 130 that is a distance from a second face 120, wherein the distance between the second bolt-hole 130 and the second face 120 is the same distance as the first distance. Further, the distance between the second bolt-hole 130 and the first face 110 may be the same as the distance between the first bolt-hole 130 and the second face 120. This can provide the proper alignment of a bolt-hole 130 and a bolt-receiver of a vise jaw that has an oblong configuration; such bolt-holes 130 would not share a common axis. The distance between the bolt-hole 130 and either the first face 110 or second face 120 of the vise-jaw cover 100 can be such that the when the first or second face is the work engaging surface of a vise-jaw cover 100, the vise-jaw cover 100 can be disposed onto the work engaging inner face of the vise jaw and secured in place with a bolt. Such bolt-hole placement may be necessary for embodiments of the reversible vise-jaw cover for vise jaws having a bolt receiver that is closer to one of the inner or outer face.

FIG. 3 is a right side view of an embodiment of a vise-jaw cover 100. In this view, the V-shaped grooves of the first horizontal groove 112 and the second horizontal groove 114 are clearly shown. In some embodiments, the depths of the two horizontal grooves can vary to accommodate different firearm elements. More specifically, as mentioned above in greater detail, the first horizontal groove 112 can be shallower than the second horizontal groove 114. Other embodiments may have horizontal grooves with the same depth or where the depths are reversed form the present embodiment such that the first horizontal groove 112 is deeper than the second horizontal groove 114.

The lower side of the vise-jaw cover 100 may further include an opening 140 in the core, as illustrated in FIG. 3. The opening 140 may vary in size to accommodate a particular vise jaw. In some cases, the opening 140 may encompass the entire lower side of the vise-jaw cover 100. In other cases, the lower side of the vise-jaw cover 100 may have a portion that is solid and a portion that is the opening 140. As illustrated in FIG. 7A, the opening 140 can lead to a hollow cavity in the core. This hollow cavity may be defined by the front face 110, back face 120, the top and the sides of the vise-jaw cover 100. It can be a rectangular prism or, as illustrated in FIG. 7A, it may be wedge-shaped. The hollow cavity may, in some embodiments, be defined by a width, a depth, and a length of a vise jaw.

As illustrated in FIG. 3 and mentioned briefly above, the vise-jaw cover 100 may further include a second face 120. The second face 120 can include an overlay 122 adhered to the surface of the second face 120. The overlay 122 may be comprised of a deformable material and may be configured into a rectangular prism that fully covers the second face 120. However, in some embodiments, the overlay 122 may only cover a portion of the second face 120. For example, it may cover a center portion such that the remaining, exposed portion of the second face 120 forms a perimeter around the overlay 122. Alternatively, the overlay 122 may be positioned nearer to the top, the bottom, or one of the sides. In yet another example, the overlay 122 may be comprised of multiple pieces that together make up the overlay 122 and are spaced apart on the second face 120 such that portions of the second face 120 are visible. The deformable material of the overlay 120 may consist of M. foam, #13 foam, #7 foam, and combinations thereof. These materials are unique in that they can be permanently adhered to the second face 120 and can obtain purchase of an object upon its work engaging face when used with either a vise jaw or a covered vise jaw.

As illustrated in FIG. 3, a bolt-hole 130 may be disposed in the right side and can be equidistance from a first face 110 and a second face 120. Other embodiments may have two bolt-holes 130, wherein one bolt-hole 130 is on each side of the view-jaw cover 100. As described above, on one side, either left or right, the first bolt-hole 130 can be a set distance from a first face 110, and on the opposite side, the second bolt-hole 130 can be the same set distance from a second face 120. Additionally, the distance from the first bolt-hole 130 to the second face 120 may match the distance from the second bolt-hole 130 to the first face 110, and this distance may be different than that distance between the first bolt-hole 130 and the first face 110/second bolt-hole 130 and the second face 120. The set distance between the bolt-holes and the faces may mirror the distance from the work-engaging face of a vise jaw to a bolt-receiver within the vise jaw. More specifically, the distance of a bolt-hole 130 from either the first face 110 or the second face 120 can be defined by the location of bolt-receivers 203 of a vice jaw. The interaction between a bolt-hole 130, a bolt-receiver 203, and a bolt (not shown) allows the vise-jaw cover 100 to be locked in a position on the vise jaw. The inner face of a vise jaw (i.e., the work-engaging face of the vise jaw) can be disposed behind either the first face 110 or the second face 120 to allow one of the faces to be the work-engaging face of the vise-jaw cover 100. In other words, the vise-jaw cover 100 can be placed over the vise jaw in one of two configurations (either the first face 110 facing inward or the second face 120 facing inward), and the face of the vise-jaw cover 100 that is facing inward becomes the work-engaging surface. A bolt may be any elongate device that is structured to fit snugly within a bolt-hole and bolt-receiver. In some situations, the bolt and bolt-receiver may be threaded, and in some embodiments pin 212 may act as a bolt to secure the vise-jaw cover.

Provided in FIG. 4 is the left side view of an embodiment of a vise-jaw cover 100. FIG. 4 is the opposite symmetrical view of the embodiment of FIG. 3. As illustrated, the bolt-holes 130 can be co-axial and equidistant from the first face 110 and the second face 120. More specifically, the bolt-holes 130 can be symmetrical such that they are vertically and horizontally in line with each other. Additionally, the bolt-holes 130 can be located above, and centered on, a cutout in each side of the vise-jaw cover 100. More specifically, the first face 110 and the second face 120 may span completely from the top to the bottom of the vise-jaw cover 100, whereas the sides of the cover 100 may each have a cutout near the opening 140. These cutouts can create a gripping point for a user to grab a vise jaw when removing the cover 100 and can also allow the first and second faces 110 and 120 to flex. These openings may, as illustrated in FIGS. 3 and 4, be rectangular or they may be any other shape or set of shapes.

Figure 4A:
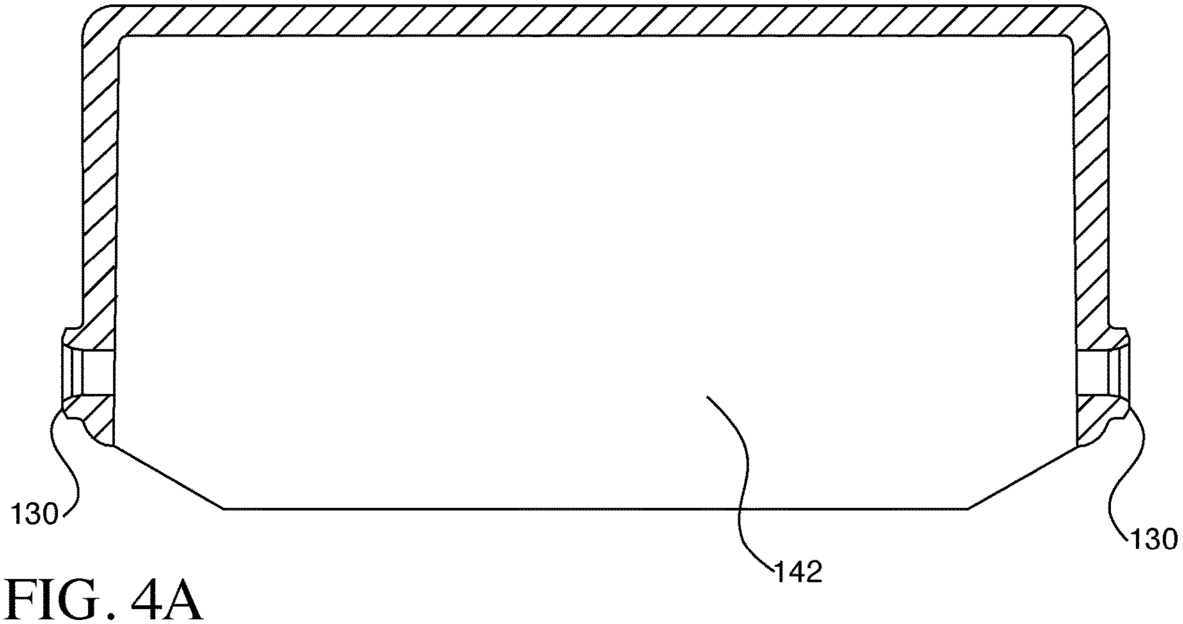
FIG. 4A is a cross-sectional view taken from the line A-A of the embodiment of a multi-faceted vise-jaw cover of FIG. 4.

As illustrated in FIG. 4A, taken from the line A-A in FIG. 4, the interior 142 of the core of a vise-jaw cover 100 may be hollow, and the interior 142 of the core can be configured to accommodate a vise jaw. In some embodiments, a vise jaw (not shown) would be symmetrical, such that its work engaging face is structured and configured in the same shape as its non-work engaging face. Other embodiments of the vise-jaw cover 100 may include an interior 142 that is configured to accommodate non-symmetrical vise jaws.

The bottom plan view of FIG. 5 shows the opening 140 and the interior 142 of the vise-jaw cover 100. The plurality of vertical grooves 116, as illustrated in FIG. 5, can run the entire height of the first face 110 and can be perpendicular to the right and left sides of the vise-jaw cover 100. As described previously, other embodiments may contain vertical grooves 116 that are not perpendicular but are angled and may still run the entire height of the first face 110 to accommodate more desirous holding positions within the first face 110.

The top plan view of FIG. 6 again shows the plurality of vertical grooves 116 that run the entire height of the first face 110 and are perpendicular to the right and left sides of the vise-jaw cover 100. A structure for each bolt-hole 130 may project from the side in which it is installed (for example, left or right) to accommodate a bolt and provide a means to hold a vise-jaw cover 100 in place over a vise-jaw.

Figure 7:
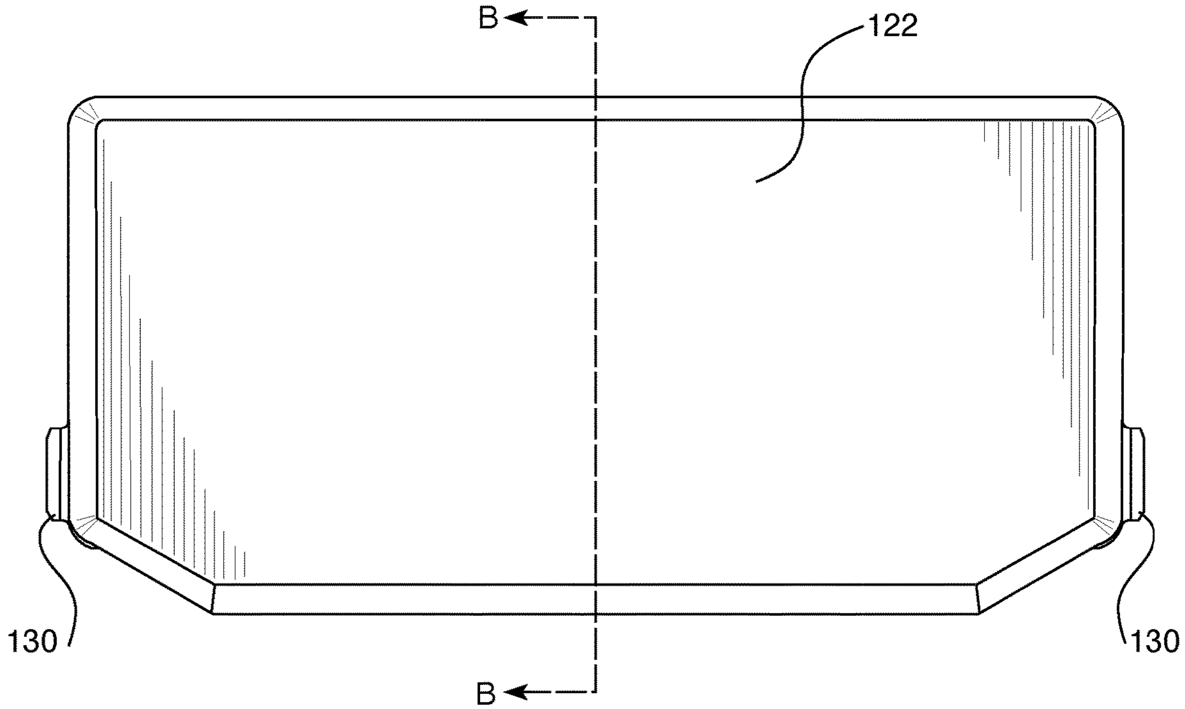
FIG. 7 is a back view of a second face of an embodiment of a multi-faceted vise-jaw cover marked with cross-section B-B.
Figure 7A:
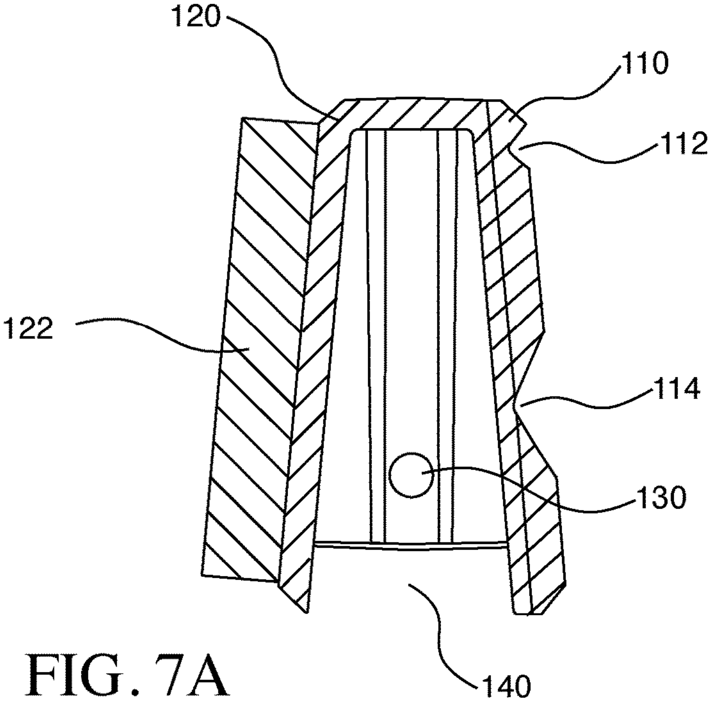
FIG. 7A is a cross-sectional view taken from the line B-B of the embodiment of a multi-faceted vise-jaw cover of FIG. 7.

The plan view of a second face 120 on an embodiment of a vise-jaw cover 100 is provided in FIG. 7. Here, the deformable overlay 122 is shown with a uniform, smooth surface. However, the deformable overlay 122 may, in some embodiments, have a textured surface or a surface with wedges, divots, channels, or other cutouts or patterns that can assist with securing a device in place. The exterior face of the second face 120 may be roughly rectangular. In some cases, as illustrated in FIGS. 1 and 7, the lower corners of the second face 120 and/or the deformable overlay 122 may be angled. The bolt-holes 130 may be positioned above these angled cuts, as illustrated in FIG. 7. As mentioned above, the deformable overlay 122 can be made a of a second material that is a different material than that of the core. The deformable overlay 122 may attach to the second face 120 of the core using an adhesive. In some cases, the attachment may be permanent. In other cases, it may be removable such that the overlay 122 can be easily replaced.

The cross-sectional view in FIG. 7A, taken from plane B-B in FIG. 7, shows the uniform structure of the core of a vise-jaw cover 100 along with the adhered overlay 122. More specifically, FIG. 7A illustrates that the core, comprised of the first face 110 and the second face 120, are comprised of one, uniform material while the deformable overlay 122 is comprised of a second, different material. The cross-sectional view further illustrates that the interior 142 of the core is wedge-shaped, wherein a top portion of the interior 142 that is nearer to the first horizontal groove 112 is narrower than a lower portion of the interior 142 that is closer to the opening 140 and the second horizontal groove 114.

Figure 15:
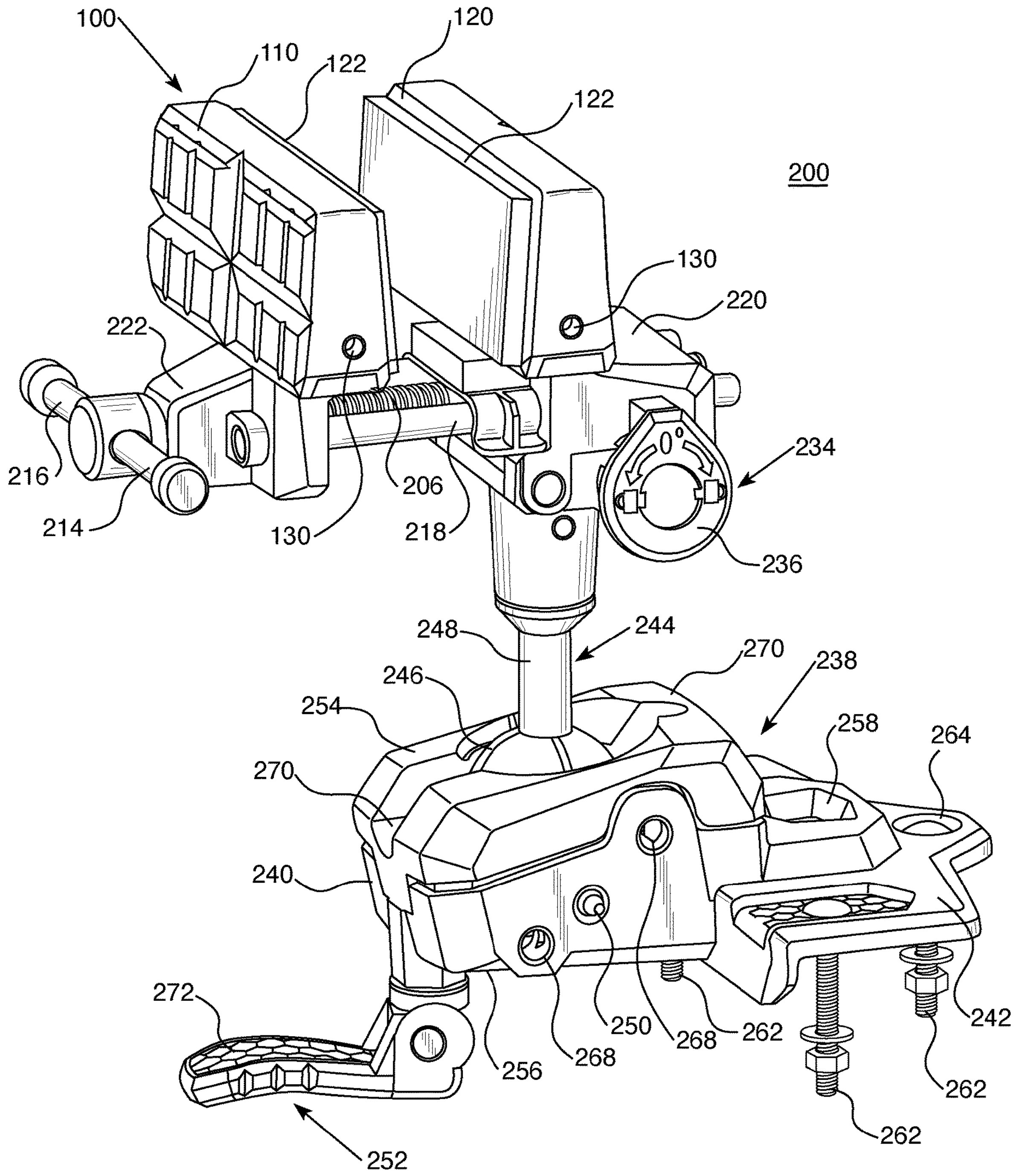
FIG. 15 is a perspective view of an illustrative example of an embodiment of multi-faceted vise-jaw covers disposed on a firearm vise.
Figure 16:
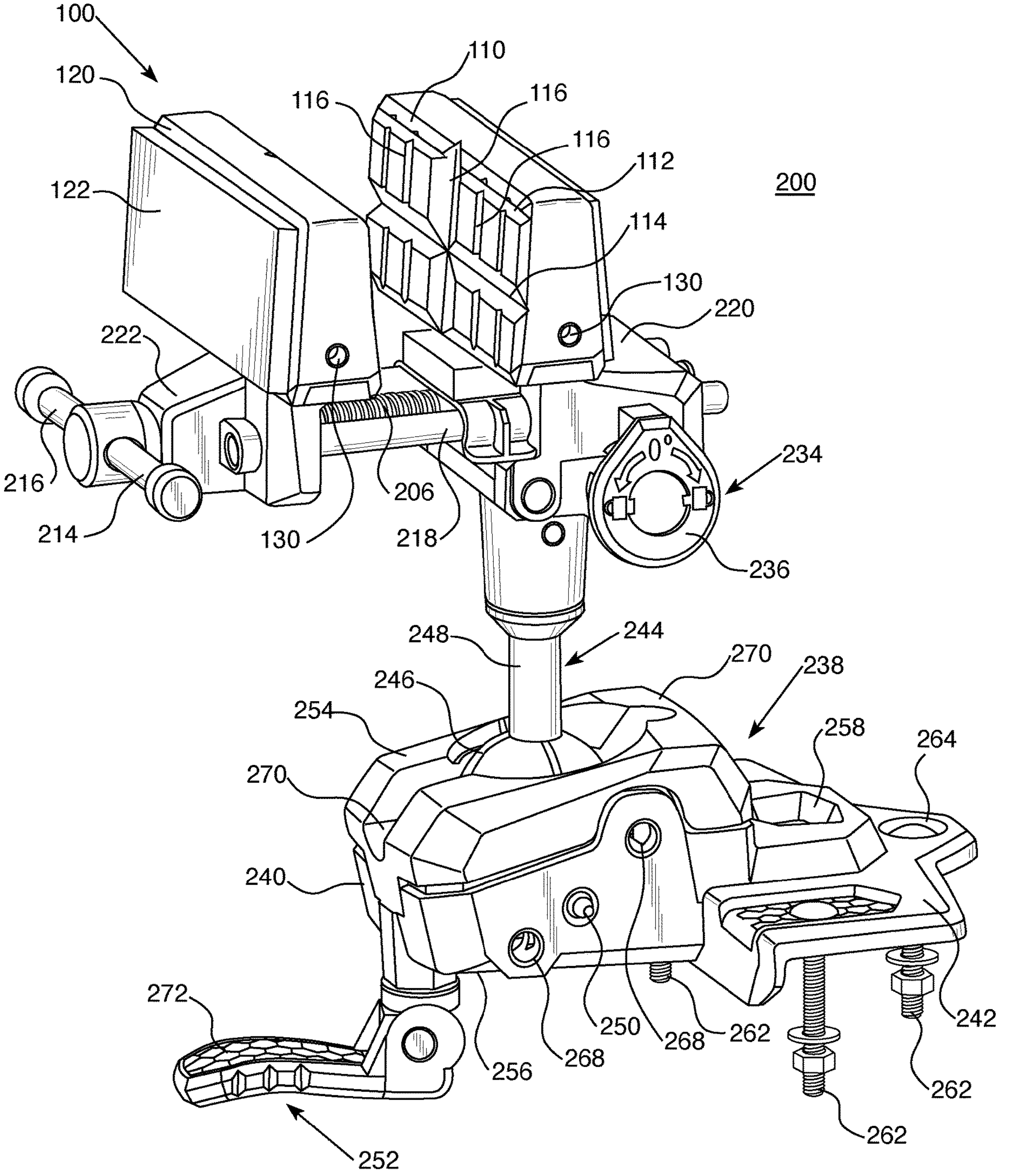
FIG. 16 is a perspective view of another example of an embodiment of multi-faceted vise-jaw covers disposed on a firearm vise.

In some embodiments, vise-jaw cover 100 may be paired with a vise. For example, vise 200, as illustrated in FIGS. 8 and 15-16, may include vise jaws 202 that each have a plurality of bolt-receivers 203. Vise jaws 202 may be connected to each other by threaded rod 206 and may be comprised of first jaw 202*a* and second jaw 202*b*. Further, bolt-receivers 203 in one or both of vise jaws 202 may, as described above, be located on the left and right sides of vise jaws and may be mirror images of each other. FIG. 15 illustrates a pair of vise-jaw covers 100 where the second face 120 of each of the vise-jaw covers 100 have their deformable overlay 122 as the working surface of the vise 200. In such a configuration, as illustrated in FIG. 15, the vise 200 may be used to hold objects that have irregular shapes or where the surface of the object being held may be easily marred by less deformable material.

In another example of vise-jaw cover placement, FIG. 16 illustrates a pair of vise-jaw covers 100 where the first face 110 of each of the vise-jaw covers 100 have their horizontal grooves 112, 114 and vertical grooves 116 act as the working surface of the vise 200. In such a configuration, as illustrated in FIG. 16, the vise 200 may be used to hold a firearm that includes a Picatinny rail by placing the Picatinny rail into the opposing grooves of the pair of first faces 110. The same may be done with the barrel of a firearm.

In some embodiments, vise jaws 202 may have relatively flat inner faces, and the flat inner faces may be textured to increase friction with a clamped component, such as firearm support device 300. However, a textured surface is not necessary for vise jaws 202 to securely clamp a component, as is described in detail below. Therefore, the inner face of each vise jaw 202 may, alternatively, be smooth. In some cases, inner faces 210 of vise jaws 202 may be parallel to each other and may be mirror images of each other such that when they are moved together so that the inner faces touch, the entire surface of one inner face touches the entire surface of another. However, in other embodiments, the inner faces may have slightly different dimensions and/or sizes such that one is smaller or larger than the other. In addition to inner faces, vise jaws 202 can have top and side edges, which may be flat and angled 90 degrees from inner faces 210, as illustrated in FIGS. 8-11, as well as outer faces 208, which may be flat or decoratively patterned. Further, the outer face may be parallel to the inner faces or may slope outward from the top to the bottom, as illustrated in FIGS. 8-9.

As mentioned above, vise jaws 202 may not need a textured surface to securely clamp a component in place. To accomplish a secure clamp, a vise-jaw cover 100 may be placed over each vise jaw 202, and either the first face 110 or the second face 120 may more securely fit the clamped components than inner faces 210 through use of horizontal grooves 112, 114, vertical grooves 116, or deformable overlay 122. For example, first horizontal groove 112 may be sized to specifically accommodate a Picatinny rail, second horizontal groove 114 may be sized to specifically accommodate a firearm barrel, and deformable overlay 122 may deform when compressed so as to at least partially envelop and hold steady the component being clamped.

Figure 10:
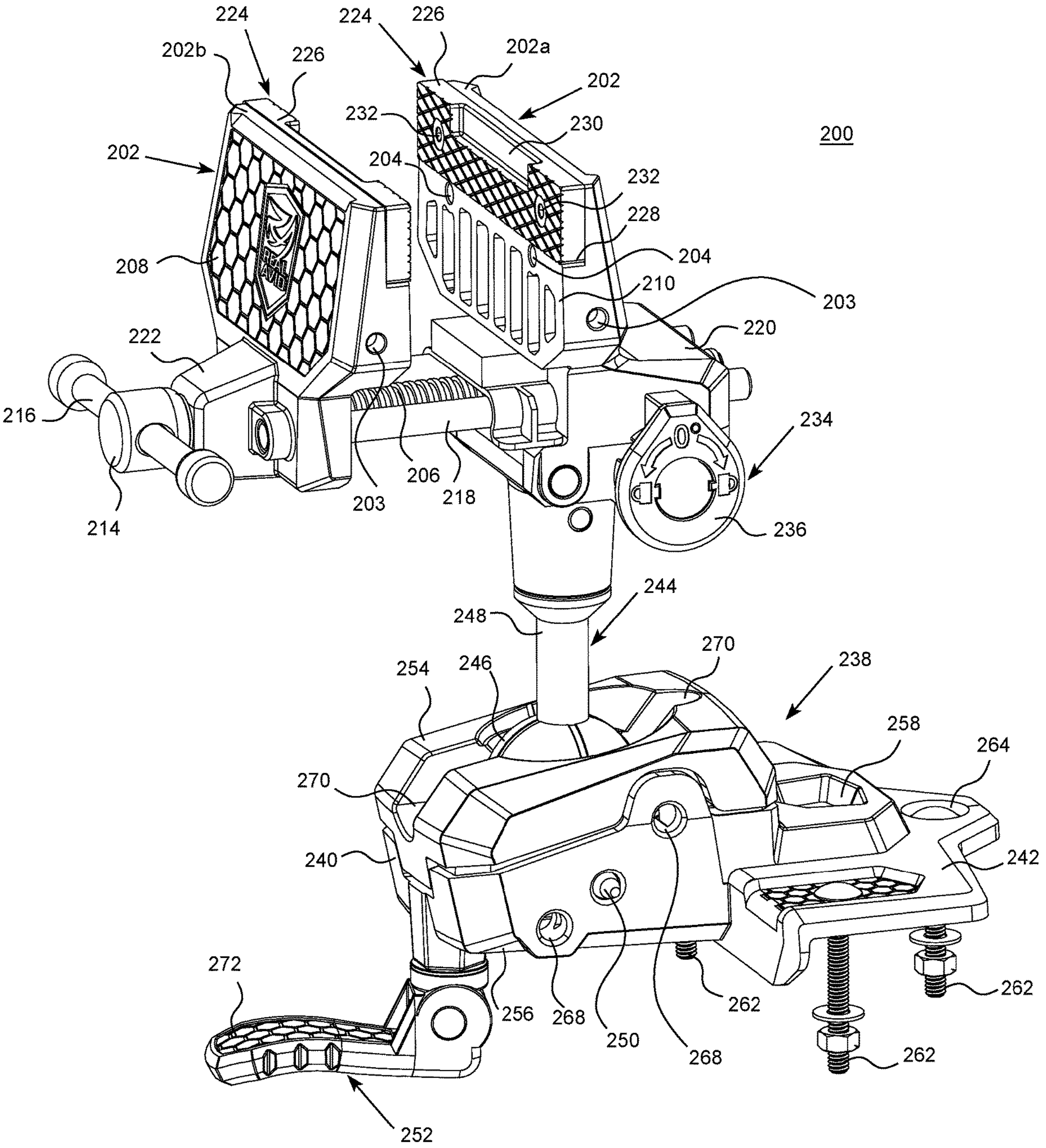
FIG. 10 is a schematic perspective view of an illustrative example of a firearm vise.
Figure 11:
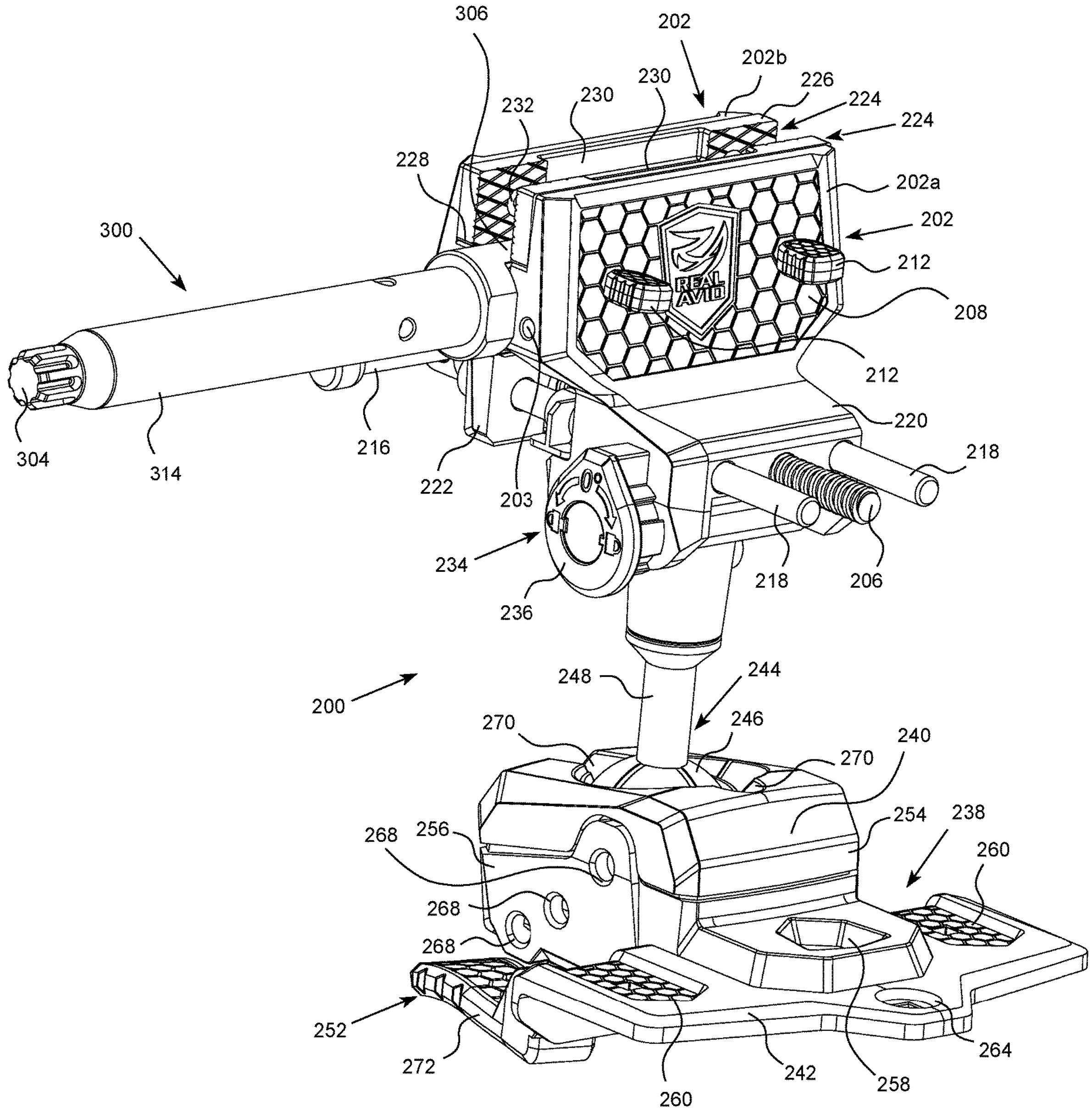
FIG. 11 is a schematic perspective view of the firearm support device of FIG. 14 clamped in the firearm vise of FIG. 10.

To accomplish a secure clamp using other means, vise jaws 202 may have a plurality of jaw pin holes 204 into which vise pins 212, 312 can be inserted to lock a clamping component, such as firearm support device 300 having vise pin holes 310, in place. Additionally, jaw pin holes 204 in vise jaws 202 may align with each other to enable a vise pin to pass from one vise jaw through to another. More specifically, jaw pin holes 204 may be located in both vise jaws 202*a/b* and aligned with each other such that one vise pin 212 can be simultaneously connected to a jaw pin hole in each vise jaw. In some embodiments, jaw pin holes 204 may extend from outer surface 208 to inner surface 210 of one or both vise jaws 202. For example, as illustrated in FIGS. 10-11, first vise jaw 202*a* may have jaw pin holes 204 that pass from outer surface 208 to inner surface 210 and second vise jaw 202*b* may have jaw pin holes that are only open to its inner surface. Therefore, when firearm support device 300 is clamped into vise 200, vise pins 212 can be inserted from outer surface 208 of vise pin holes 204 of first vise jaw 202*a* and through to inner surface 210, through the support device, and into vise pin holes 204 on the inner surface of second vise jaw 202*b* where they can be stopped by the remaining solid material of the second vise jaw. While vise pin holes 204 are illustrated herein on outer surface 210 of first vise jaw 202*a*, it is noted that first vise jaw 202*b* can have vise pin holes 204 that penetrate from the outer surface through to the inner surface as well.

In some embodiments, some or all of jaw pin holes 204 in first jaw 202*a* can align with some or all of the jaw pin holes in second jaw 202*b*. Therefore, when a vise pin is inserted into vise jaws 202, it can insert into both first jaw 202*a* and second jaw 202*b* via the aligned jaw pin holes 204. In one configuration, jaw pin holes 204 may horizontally align with each other on each vise jaw 202. For example, as illustrated in FIGS. 10-11, two holes from vise jaw 202 may be aligned along a horizontal line such that they are the same distance from the top and/or bottom of first vise jaw 202*a*. This allows the component to be locked in a parallel configuration to inner faces 210 of vise jaws 202, as illustrated in FIG. 11. Other jaw pin hole configurations may include two holes aligned along a vertical line such that when vise 200 is upright, the first hole is directly above, or below, the second hole, and the component can be locked perpendicular, or 90 degrees, to inner faces 210. These are not the only alignments or configurations that may be possible. Further alignments or configurations can include any angle such as, but not limited to, jaw pin holes that allow for the component to be locked at a 30-degree angle, a 45-degree angle, and a 60-degree angle to the inner face. There may be several jaw pin holes in each vise jaw such that any or all of the above-mentioned hole configurations are accessible to a user. For example, in one embodiment, each vise jaw may have four vise pin holes, wherein two of the vise pin holes vertically align on one half of the vise jaw, two of the vise pin holes vertically align on another half of the vise jaw, the top two vise pin holes are horizontally aligned with each other, the bottom two vise pin holes are horizontally aligned with each other, and the bottom vise pin holes and their opposite side, top vise pin hole are in 45-degree alignment.

Vise pins 212, 312 may be structured and configured to be received by any of the plurality of vise pin holes 310 of clamping portion 306, as described further herein, as well as by any of the plurality of jaw pin holes 204 of vise jaws 202, such that the vise pins are elongate and cylindrical in form and the vise pin holes are similarly shaped and dimensioned to enable a friction fit. More specifically, the external circumference of vise pins 212, 312 may be substantially equivalent, albeit slightly smaller, to the internal circumference of vise pin holes 310 and jaw pin holes 204. Vise pins 212, 312 may be inserted from the outer surface of vise jaw 202, thereby allowing user to clamp a clamp component between the vise jaws prior to inserting the vise pins. Further, if the clamped component, such as firearm support device 300, has pin holes, the clamped component may first be secured between vise jaws 202 and then vise pin 212, 312 can be inserted into one vice jaw, through the clamped component, and into the second jaw. If two or more vise pins 212, 312 are used, this can lock the clamped component securely in place for the user to work with. So positioned, the vise pins 212, 312 can serve to define and assist in maintaining a working angle for the clamped component (for example, firearm support device 300). In some embodiments, vise pins 312 may be simple cylindrically shaped pins. Alternatively, vise pins 212 may have a head or grip on one end of a cylindrical shaped pin portion, as illustrated in FIG. 11, to offer users a more ergonomic grip when placing the vise pin through vise jaws 202 and the clamped component. The head or grip may be textured or smooth and may have any ergonomic shape, such as an elongated mushroom head, ball, or any other grab point.

To clamp vise jaws 202 on a clamping component, such as firearm support device 300, second jaw 202*b* may be moveable relative to first jaw 202*a*, such that the second jaw can move toward and away from the first jaw along threaded rod 206. More specifically, vise jaws 202 may further include bases 220, 222, and the bases may house threaded rod 206 and be positioned below the vise jaws, allowing for inner faces 210 of the vise jaws to be free from interference of the threaded rod when clamping onto a component. For example, first jaw 202*a* may be connected to a top portion of, or molded from the same part as, clamp base 220, and second jaw 202*b* may be connected to a top portion of, or molded from the same part as, jaw base 222. Further, jaw base 222 may connect to clamp base 220 via threaded rod 206, enabling second jaw 202*b* to move relative to first jaw 202*a*. To enable rotation of threaded rod 206 and movement of one vise jaw toward another, the threaded rod may have a screw head attached on one end that a user can rotate. More specifically, screw head 214 may be attached to threaded rod 206 on an outer portion of jaw base 222 of second jaw 202*b*, as illustrated in FIGS. 8-10. Further, screw head 214 may have an aperture through which handle 216 can be inserted. In some cases, screw head 214 and handle 216 may be one singular molded part and in other cases, they may be separate parts. Handle 216 can be elongated and rigid, such that it will not bend or flex when human pressure is applied to the handle. Additionally, handle 216 may be straight, as illustrated, or have curvature, which can provide an ergonomic grip to user. When handle 216 is turned, it can cause rotation of screw head 214, which can cause rotation of threaded rod 206. Rotation of threaded rod 206 can then cause second jaw 202*b* to move toward or away from first jaw 202*a*. For example, clockwise rotation of threaded rod 206 may cause second jaw 202*b* to move toward first jaw 202*a*, while counterclockwise rotation of the threaded rod may cause second jaw to move away from first jaw.

In addition to threaded rod 206, jaw base 222 may also be connected to clamp base 220 via one or more guide bars 218. Guide bars 218 may be smooth so as not to provide excess friction when second jaw 202*b* moves toward first jaw 202*a*. Further, guide bars 218 may be cylindrical, as illustrated in FIGS. 10-11, or may have another shape such as rectangular or pyramidal, and they may offer additional support for when heavy components are clamped between vise jaws 202. This additional support may keep vise jaws 202 from becoming misaligned if they are twisted due to torque applied during use of vise 200, and the support may also prevent threaded rod 206 from bending due to having to withstand too much torque. In some embodiments, as illustrated in FIG. 9, vise 200 may include two guide bars 218 that are parallel to, and on opposite sides of, threaded rod 206.

In some embodiments, vise jaws 202 may each have a ledged, upper recess on inner faces 210 such that the vise jaws are compatible with insert 224. Insert 224 may be approximately rectangular with flat inner and outer faces, which may be parallel to each other, may have top long edge 226 and bottom long edge 228, and the upper recess in vise jaws 202 may be approximately the same size and shape as the insert such that when the insert is attached to the vise jaw, the side and upper edges of both the vise jaw and the insert align and the inner faces are on the same plane. In some cases, the inner face of insert 224 may be textured (for example, knurled) and the outer face of the insert may be smooth, although this is not required and either or both faces may be textured or smooth. If the outer face of insert 224 is smooth, the surface of the ledged, upper recess may also be smooth to prevent gaps between the insert and the upper recess when they are connected together. Since insert 224 may be removable, an attachment mechanism can be used to keep the insert connected to vise jaw 202. More specifically, vise jaw 202 and insert 224 may be attached or connected using connections such as, but not limited to, screws 232, as illustrated in FIGS. 8 and 10, snap fit connections, or dove tail connections.

Insert 224 may have cutout or recess 230 along top long edge 226 or bottom long edge 228 that is roughly rectangular. In some embodiments, the cutout/recess is through the entire insert, thereby causing the insert to have a u-shape. In other embodiments, cutout/recess 230 is only a portion of a long edge such that the back of insert 224 remains a complete rectangle, as illustrated in FIGS. 8 and 10. Further, insert 224 may be reversible and, if so, cutout/recess 230 along top long edge 226 may be along a top portion when insert is in one configuration and it may be along a bottom portion when insert is rotated 180 degrees into a reversed configuration.

In some embodiments, if jaw pin holes 204 are located in the region of vise jaws 202 where insert 224 attaches, then in order to retain the securing function of vise pins 212, 312 when the insert is attached to the vise jaw, the insert can have insert pin holes that align with jaw pin holes 204. More specifically, the insert pin holes may be positioned such that they align with jaw pin holes 204 regardless of whether insert 224 is upright or upside down. For example, the insert pin holes may be located in the center of the insert. In other embodiments, the insert may have a first set of holes that align with jaw pin holes 204 in a first configuration and a second set of holes that align with the jaw pin holes when the insert is in the reversed configuration. However, to simplify the design of vise 200, jaw pin holes 204 may be located beneath the connection region of insert 224 with vise jaws 202, as illustrated in FIG. 10.

In addition to connecting to first vise jaw 202*a*, clamp base 220 may also include, and be controlled by, leveling knob 234, which may also indirectly control jaw base 222 via its attachment to the clamp base vis-a-vis threaded rod 206. Leveling knob 234 may include a pin/rod (not shown), a spring (not shown), and knob 236 connected to an outer end of the pin/rod. The pin/rod may be locked within clamp base 220 when leveling knob 234 is in its home position. Then, when knob 236 is pulled out, the spring can be compressed, the pin/rod can be pulled out and removed from its home position, and leveling knob 234 may be able to rotate left or right. This left or right rotation can rotate vise jaws 202 a few degrees in one direction or another, which may help to level the vise jaws and the clamped component, such as firearm support device 300, for maintenance or other work. In some cases, when leveling knob 234 is rotated, the pin/rod is structured and configured such that it is prevented from locking back into its home position. However, leveling knob 234 may still provide enough friction and/or pressure to keep vise jaws 202 level until the user resets the leveling knob back into its home position.

In some embodiments, vise 200 may include vise base 238, which can connect to vise jaws 202 via clamp base 220, as illustrated in FIGS. 10-11. Vise base 238 may be used to mount vise 200 to a flat surface such as a workbench or table and may include housing 240, table mount 242, and a table clamp (not shown). Connection of vise base 238 to clamp base 220 may be via ball joint 244, which can include ball 246, stem 248, ball lock 250, and/or cam latch 252, as illustrated in FIG. 10. Alternatively, connection of vise base 238 to clamp base 220 can also take place by a fixed connection component such as, but not limited to, a rod, neck, or post. Connection by ball joint 244 may allow for fewer jaw pin holes 204 since vise jaws 202 can move the clamped component, such as firearm support device 300, into many positions, angles, and configurations due to the flexibility of the ball joint, whereas connection by a fixed connection component may be more compatible with embodiments of the vise jaws that include additional jaw pin holes since the additional jaw pin holes will enable the clamped component to be moved into more than one secured position.

Housing 240 of vise base 238 may be comprised of one or more parts. In embodiments having ball joint 244 as a connection mechanism between vise base 238 and clamp base 220, housing 240 can have at least two parts, such as top portion 254 and bottom portion 256, to aid in assembly and, as mentioned in more detail below, locking of the ball joint via a clamping mechanism. In embodiments having a fixed connection component, the housing may be limited to one piece. Housing 240 may be either connected to table mount 242 or may be a continuous piece with the table mount such that they are not removable from each other. In some cases, housing 240 may have a top portion separate from a bottom portion, and the bottom portion may be one continuous piece with table mount 242. Other configurations are possible.

As mentioned above, table mount 242 and the table clamp (not shown) can secure vise 200 to a flat, working surface such as a workbench or table. Therefore, table mount 242 may have a flat bottom face to increase the amount of surface area in contact with the working surface and to allow for a secure mount to the working surface. The top of table mount 242 may also be flat or may have additional features. For example, the top of table mount 242 may include storage trays, cavities, or pockets 258 for holding tools or firearm parts. In some embodiments, the top of table mount may include recessed portion 260 that is structured and configured to receive a portion of table clamp. Further, housing 240 may connect to table mount 242 along a central portion such that the table mount may have recessed portion 260 on either side of the central portion, as illustrated in FIG. 11. This allows for two table clamps to secure table mount 242 to the working surface. More specifically, the table clamp may be a c-clamp, and a top arm of the table clamp may nest into recessed portion 260 on table mount 242. This recessed portion may be smooth, or it may have a texture so as to increase friction and prevent unwanted sliding between table mount 242 and a table clamp. Another method for connecting table mount 242 to a work surface is via screws, as illustrated in FIG. 10. More specifically, recessed portion(s) 260 may include holes or openings into which screws 262 can be inserted. Further, table mount 242 may have connection point 264 specifically structured and configured for screw 262, as further illustrated in FIG. 10, wherein the connection point is a recessed portion that is smaller than recessed portion 260 and shaped more similarly to a screw head.

Figure 12A:
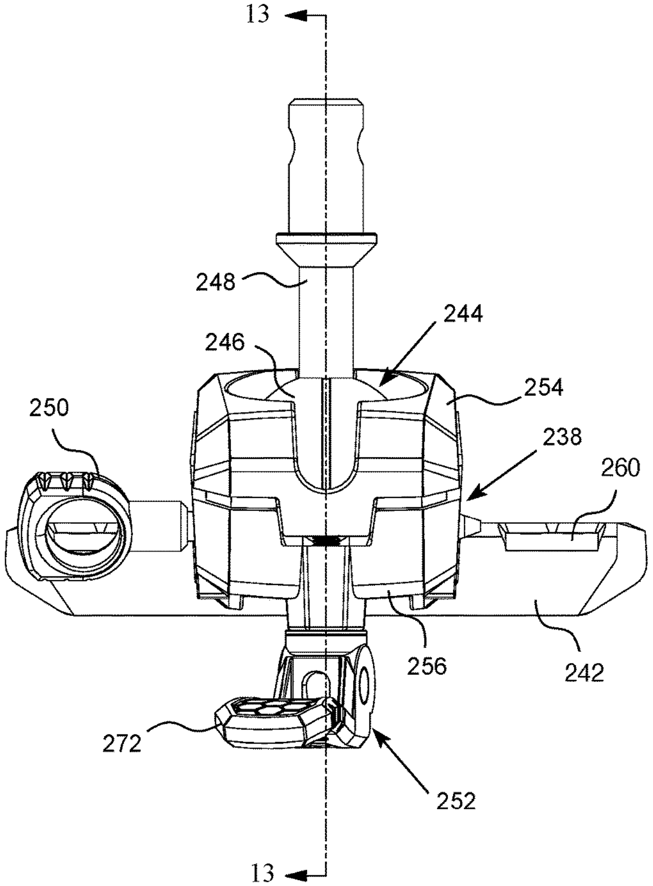
FIG. 12A is a schematic front view of a portion of the firearm vise of FIG. 8.
Figure 12B:
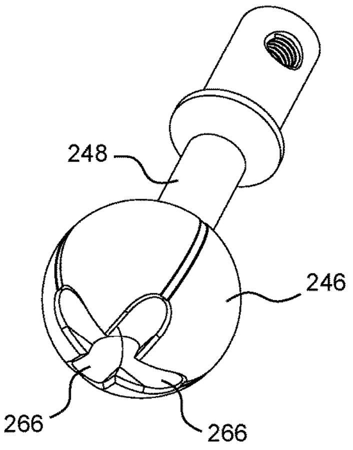
FIG. 12B is a schematic perspective view of a portion of a ball joint of the firearm vise of FIG. 8.
Figure 13:
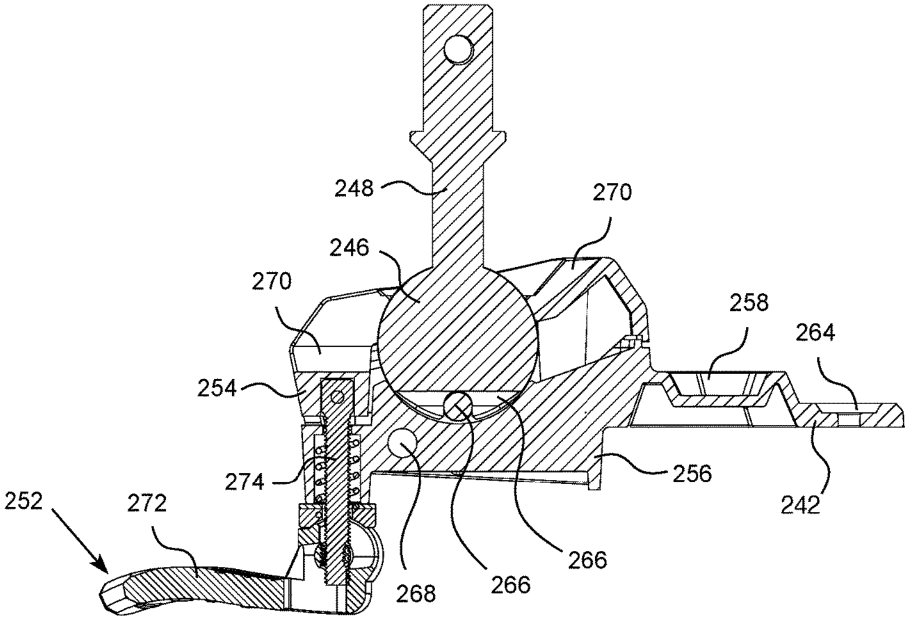
FIG. 13 is a schematic cross-sectional side view of the portion of the firearm vise of FIG. 13*a* taken from the line 13-13 in FIG. 12A.
Figure 14:
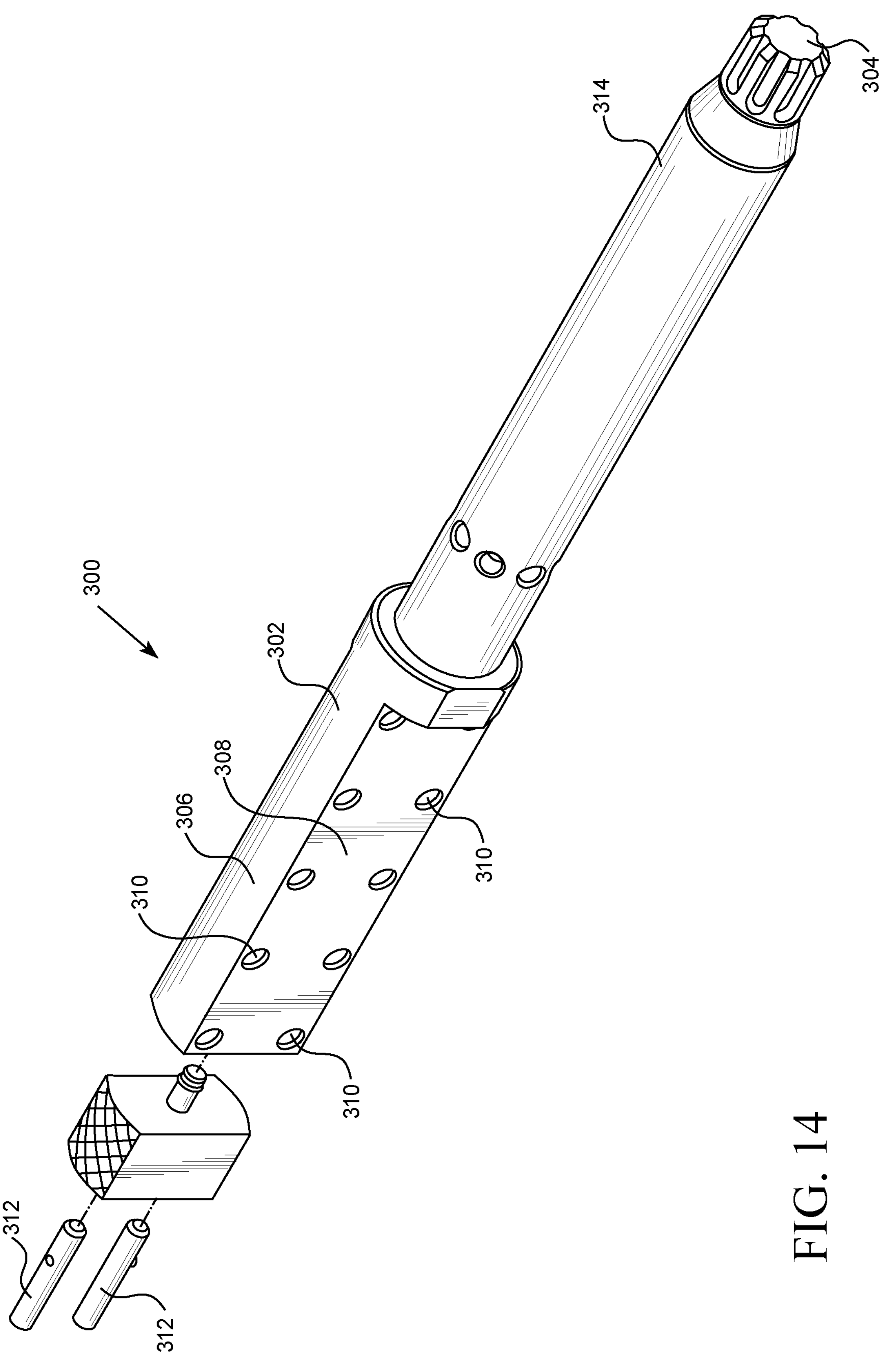
FIG. 14 is a schematic perspective view of an example of a firearm support device.

As mentioned above, housing 240, in addition to connecting to table mount 242, can connect to a connection component, such as ball joint 244, to connect vise base 238 to clamp base 220. As illustrated in FIGS. 10 and 12A, ball joint 244 may include ball 246, stem 248, and ball lock 250, wherein the stem can be connected on a first end to the ball and on a second end to clamp base 220, and the ball lock can secure the ball in one or more predetermined positions. Ball 246 may be located at least partially within housing 240 or, alternatively, may be completely surrounded by the housing. In some embodiments, ball 246 may be comprised of one or more passages 266 into which ball lock 250 can be inserted in order to lock the ball in a predetermined position. More specifically, ball 246 can include two passages 266 that may be located along a bottom of ball joint, may be perpendicular to each other, and may cross through each other, as illustrated in FIG. 12B. Passages 266 may not run completely through ball 246, but may be open such that ball lock 250, when inserted into a passage, is not surrounded by the ball but is wedged between the ball and an interior of housing. Housing 240 may, therefore, include a plurality of ball lock holes 268 into which ball lock 250 can be inserted. One embodiment may include three ball lock holes 268 in housing 240, as illustrated in FIGS. 10-11, and two perpendicular passages in ball 246, as illustrated in FIG. 12B, enabling ball lock 250 to secure ball joint 244 in one of eight positions: facing forward and vertical, left and vertical, right and vertical, or back and vertical when the ball lock is inserted through, for example, a middle ball lock hole, and facing forward and horizontal, left and horizontal, right and horizontal, or back and horizontal when the ball lock is inserted through a back ball lock hole. The third ball lock hole (for example, the hole closest to cam latch 252 in FIG. 10) may be used as a storage hole when ball lock 250 is not in use. The top of housing may include recessed passages 270 near its front and back to accommodate stem 248 of ball joint 244 when the ball joint is in a horizontally forward or backward position, respectively.

In addition to ball lock 250, which can be used to lock ball 246 securely in place when high amounts of torque may be applied to vise jaws 202, the ball joint may include cam latch 252 for securing the ball within housing 240 in additional positions that are not compatible with ball lock holes 268 and the ball lock. Cam latch 252 may help connect top and bottom of housing 254, 256 and can be used to lock ball 246 in any position by compressing the top and bottom of the housing onto the ball. More specifically, cam latch 252 can include lever 272 and threaded rod 274, and top and bottom of housing 254, 256 can have a threaded receiving cavity for receiving the threaded rod. To secure ball 246 in housing 244, lever 272 can be twisted (for example, counterclockwise), thereby turning threaded rod 274 within the threaded receiving cavity and pulling top and bottom of housing 254, 256 toward each other and tightening housing 240 around the ball. Lever 272 of cam latch 252 can then be rotated 90 degrees to lock in place, which prevents countertwisting of threaded rod 274 and adds additional compression to ball 246. To loosen ball 246, lever 272 can be straightened, rotated in the opposite direction (for example, clockwise), thereby turning threaded rod 274 within the threaded receiving cavity in the opposite direction and allowing top and bottom of housing 254, 256 to separate from each other and from the ball.

In practice, vise 200 can be used together with vise-jaw cover 100 or firearm support device 300 to securely position a firearm in place when maintenance or assembly of the firearm is needed. Examples are provided below for each.

To assemble vise-jaw cover 100 with vise 200 for use with a tool or firearm, a user can place vise-jaw cover 100 over each of the two vise jaws 202 of vise 200. More specifically, opening 140 of vise-jaw cover 100 can be positioned over the top of vise jaw 202 and vise-jaw cover 100 can be slid down on top of vise jaw 202 such that interior 142 of vise-jaw cover 100 is filled by vise jaw 202. As mentioned above, either first face 110 or second face 120 may be positioned to be the engaging face over inner surface 210 of vise jaw 202. Once placed over vise jaw 202, at least one bolt-hole 130 can align with bolt-receiver 203 so that a bolt (not illustrated) can be inserted through the at least one bolt-hole 130 and into corresponding bolt-receiver 203. If two bolt-holes 130 align with two bolt-receivers 203, then two bolts can be inserted into each of the bolt-hole/bolt-receiver combinations.

To assemble firearm support device 300 with vise 200 for use with a tool or firearm, a user can place firearm support device 300 between two vise jaws 202 of vise 200. Firearm support device 300 can have clamping portion 306, which can include two parallel clamping faces 308 on opposite sides of the clamping portion and which can define a plurality of vise pin holes 310. Vise jaws 202 can be comprised of first jaw 202*a* and second jaw 202*b*, and the first and second jaws can each define a plurality of jaw pin holes 204, wherein the jaw pin holes can extend between outer surface 208 of one or both jaws and inner surface 210 of each jaw. Once placed between vise jaws 202, the user can align at least two of the plurality of vise pin holes 310 with at least two of the plurality of jaw pin holes 204 from each jaw 202 and can clamp firearm support device 300 between the first and second jaws 202*a/b* of vise 200, thereby implementing a first locking feature. To further secure firearm support device 300 within vise 200, the user can next insert a vise pin 212 into outer surface 208 and through to inner surface 210 of one of jaw pin holes 204 of, for example, first vise jaw 202*a* and continue inserting the vise pin until it penetrates through one of vise pin holes 310 of elongate member 302 of support device 300 and into the inner surface of one of the jaw pin holes of, for example, second vise jaw 202*b*. In this manner, a second locking feature is in place, and firearm support device 300 is no longer separable from vise 200 using solely shear forces.

To further lock firearm support device 300 into a specific configuration, the user can insert a second vise pin 212 into outer surface 208 and through to inner surface 210 of a second of the jaw pin holes 204 of, for example, first vise jaw 202*a* and continue inserting the vise pin until it penetrates through a second of vise pin holes 310 of elongate member 302 and into the inner surface of a second of the jaw pin holes of, for example, second vise jaw 202*b*. Once this third locking feature is in place, firearm support device 300 is not only prevented from separating from vise 200, but it is now locked in a specific configuration that will resist user-applied torque in any direction. Therefore, a user can now insert barrel end 304 of supporting portion 314 of firearm support device 300 into an upper receiver of a firearm and can actively work on the firearm with reassurance that vise 200 will prevent unwanted movement of firearm support device 300 when it is secured in the vise.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

What is claimed is:

1. A multifaceted vise-jaw cover comprising:
a core comprised of a first material;
an overlay having a second, deformable material;
a lower side with an opening contained therein;
a right side and a left side;
a first face, wherein the first face contains a plurality of grooves; and
a second face positioned opposite the first face, wherein the second face has at least a portion that is relatively flat,
wherein
the overlay is attached to at least a portion of the second face,
the vise-jaw cover is reversible such that in a first configuration, the first face is engageable with an object being worked upon, and in a second configuration, the overlay is engageable with the object being worked upon, and
the opening enables the vise-jaw cover to secure to at least a portion of a clamping face and a portion of a top surface of a vise jaw.

2. The multifaceted vise-jaw cover of claim 1, wherein
the vise-jaw cover is disposed on the vise jaw, and
a work-engaging face of the vise jaw is disposed between the first face and the second face of the vise-jaw cover.

3. The multifaceted vise-jaw cover of claim 2, wherein the vise jaw further comprises at least one bolt-receiver disposed within a side to align with at least one bolt-hole of the vise-jaw cover.

4. The multifaceted vise-jaw cover of claim 2, wherein at least one of the right side or the left side comprises at least one bolt-hole, and the at least one bolt-hole is completely surrounded by the core.

5. The multifaceted vise-jaw cover of claim 4, wherein a removable bolt is disposed within the at least one bolt-hole and a bolt-receiver disposed within a side of the vise jaw.

6. The multifaceted vise-jaw cover of claim 2, further comprising a vise with a ball joint, wherein the ball joint connects to the vise jaw.

7. The multifaceted vise-jaw cover of claim 2, wherein the right side of the cover comprises at least one bolt-hole to align with a first bolt-receiver of the vise jaw, and the left side of the cover comprises at least one bolt-hole to align with a second bolt-receiver of the vise jaw.

8. The multifaceted vise-jaw cover of claim 7, wherein
a first bolt is disposed within both the at least one bolt-hole of the right side and the first bolt-receiver, and
a second bolt is disposed within both the at least one bolt-hole of the left side and the second bolt-receiver.

9. The multifaceted vise-jaw cover of claim 1, wherein the plurality of grooves in the first face are part of the core and separate from the overlay.

10. The multifaceted vise-jaw cover of claim 9, wherein the plurality of grooves comprises at least two parallel V-shaped grooves that run a length of the first face from the right side to the left side.

11. The multifaceted vise-jaw cover of claim 10, wherein at least one of the parallel V-shaped grooves is defined to hold at least one of a firearm picatinny rail and a firearm barrel.

12. The multifaceted vise-jaw cover of claim 11, wherein the plurality of grooves further comprises at least two vertical grooves, and wherein the at least two vertical grooves are perpendicular to the at least two parallel V-shaped grooves.

13. The multifaceted vise-jaw cover of claim 9, wherein the flat portion of the second face is part of the core and separate from the overlay.

14. The multifaceted vise-jaw cover of claim 1, wherein the overlay is permanently attached to the second face.

15. The multifaceted vise-jaw cover of claim 1, wherein the overlay has a length and width substantially equal to the length and width of the second face of the vise-jaw cover.

16. The multifaceted vise-jaw cover of claim 1, wherein the plurality of grooves comprise at least two parallel grooves that are at least one of V-shaped and U-shaped and run a length of the first face from the right side to the left side.

17. The multifaceted vise-jaw cover of claim 1, wherein the opening leads to a hollow cavity, and at least a portion of the vise jaw is receivable inside an interior portion of the vise-jaw cover.

18. The multifaceted vise-jaw cover of claim 17, wherein the hollow cavity is defined by a width, a depth, and a length of the vise jaw.

19. The multifaceted vise-jaw cover of claim 1, wherein an entirety of a work-engaging face of a vise jaw fits inside the vise jaw cover.

20. A multifaceted vise-jaw cover comprising:
a nylon core having
a lower side with an opening contained therein,
a right side and a left side, wherein the right side and left side each comprises at least one bolt-hole,
a first face, wherein the first face contains a plurality of grooves,
wherein the plurality of grooves comprises at least two parallel V-shaped grooves that run a length of the first face from the right side to the left side, and wherein one of the parallel V-shaped grooves is defined to hold a firearm picatinny rail and one of the parallel V-shaped grooves is defined to hold a firearm barrel,
further wherein the plurality of grooves further comprises at least two vertical grooves wherein the at least two vertical grooves are perpendicular to the at least two parallel V-shaped grooves;
a second face that is relatively flat; and
an overlay having a second, deformable material, wherein the overlay is attachable to the second face,
wherein
the opening in the lower side of the cover is defined by a width and a length of a vise jaw,
the at least one bolt-hole in each of the right and left sides aligns with at least one bolt-receiver in each side of the vise jaw, and the at least one bolt-hole in each of the right and left sides and the at least one bolt-receiver in each side of the vise jaw are structured and configured to receive a removable bolt.

* * * * *